US006769462B2

(12) United States Patent
Larson et al.

(10) Patent No.: US 6,769,462 B2
(45) Date of Patent: Aug. 3, 2004

(54) DISPENSING APPARATUS

(75) Inventors: John Charles Larson, West Chester, PA (US); Vincent Fred Genatempo, Jr., Cameron, WI (US); Alan Arthur Burmester, Rice Lake, WI (US); Anthony Christopher Weyek, Rice Lake, WI (US); Travis Lynn Gibson, Cumberland, WI (US)

(73) Assignees: E. I. du Pont de Nemours and Company, Wilmington, DE (US); Rice Lake Weighing Systems, Inc., Rice Lake, WI (US)

(*) Notice: Subject to any disclaimer, the term of this patent is extended or adjusted under 35 U.S.C. 154(b) by 0 days.

(21) Appl. No.: 10/397,116

(22) Filed: Mar. 26, 2003

(65) Prior Publication Data

US 2003/0192616 A1 Oct. 16, 2003

Related U.S. Application Data

(60) Provisional application No. 60/369,469, filed on Apr. 3, 2002.

(51) Int. Cl.[7] .............................. B65B 1/30; B67D 5/08
(52) U.S. Cl. .................. 141/83; 141/129; 141/130; 141/134; 222/318; 222/55
(58) Field of Search .................. 141/83, 129, 134, 141/131, 130; 222/318, 55, 1, 56, 57, 58, 135, 133, 134; 422/100, 101, 102; 73/863.32, 863.1

(56) References Cited

U.S. PATENT DOCUMENTS

| | | | |
|---|---|---|---|
| 4,019,653 A | * | 4/1977 | Scherer et al. .................. 222/1 |
| 4,705,083 A | | 11/1987 | Rossetti |
| 4,813,000 A | | 3/1989 | Wyman et al. |
| 5,065,695 A | * | 11/1991 | Baron et al. .................. 222/52 |
| 5,108,074 A | | 4/1992 | Chavaillaz |
| 5,129,551 A | | 7/1992 | Gott |
| 5,148,945 A | * | 9/1992 | Geatz .......................... 222/135 |
| 5,305,917 A | | 4/1994 | Miller et al. |
| 5,328,057 A | | 7/1994 | Hellenberg et al. |
| 5,485,941 A | | 1/1996 | Guyomard et al. |
| 5,590,960 A | | 1/1997 | Clinton et al. |

(List continued on next page.)

FOREIGN PATENT DOCUMENTS

| | | |
|---|---|---|
| EP | 0353197 B1 | 1/1990 |
| EP | 0602737 A1 | 6/1994 |
| EP | 0690294 A1 | 1/1996 |
| EP | 1260435 A1 | 11/2002 |

OTHER PUBLICATIONS

Japan Abstract, JP 2002254013, Faberu K. K., Japan: UV Coat Co., Ltd., Sep. 10, 2002.
Copy of the International Search Report, International Application No. PCT/US03/09828.

*Primary Examiner*—Gregory L. Huson
*Assistant Examiner*—Khoa D. Huynh
(74) *Attorney, Agent, or Firm*—Sudhir G. Deshmukh

(57) ABSTRACT

A dispensing apparatus includes recirculating systems though which the dispersants are recirculated to prevent settling of solid components, such as pigments that may be present in the dispersants. The apparatus includes dispensers located on a movable table positioned inside a frame assembly of the apparatus. The table is positioned to dispense a selected dispersant into a container placed atop a weighing scale through the dispenser selected in accordance with a recipe. The weight of the selected dispersant is monitored by the weighing scale and once a desired amount of the selected dispersant is dispensed, a signal is received by the apparatus from the weighing scale to switch off the dispensing of the dispersant. The table is then moved to deliver the next dispersant, required in the recipe. The process is continued until all the desired dispersants are dispensed in the container to form the composition, such as an automotive paint.

32 Claims, 16 Drawing Sheets

U.S. PATENT DOCUMENTS

| | | | |
|---|---|---|---|
| 5,632,314 A | * 5/1997 | Koppe et al. | 141/83 |
| 5,738,716 A | 4/1998 | Santilli et al. | |
| 5,938,080 A | 8/1999 | Haaser et al. | |
| 6,010,032 A | * 1/2000 | Vermylen et al. | 222/55 |
| 6,152,999 A | 11/2000 | Erdtmann et al. | |
| 6,174,356 B1 | 1/2001 | Evans et al. | |
| 6,183,548 B1 | 2/2001 | Erdtmann et al. | |
| 6,258,323 B1 | 7/2001 | Hormann et al. | |
| 6,439,437 B1 | * 8/2002 | Ollier et al. | 141/134 |
| 2002/0048213 A1 | * 4/2002 | Wilmer et al. | |

* cited by examiner

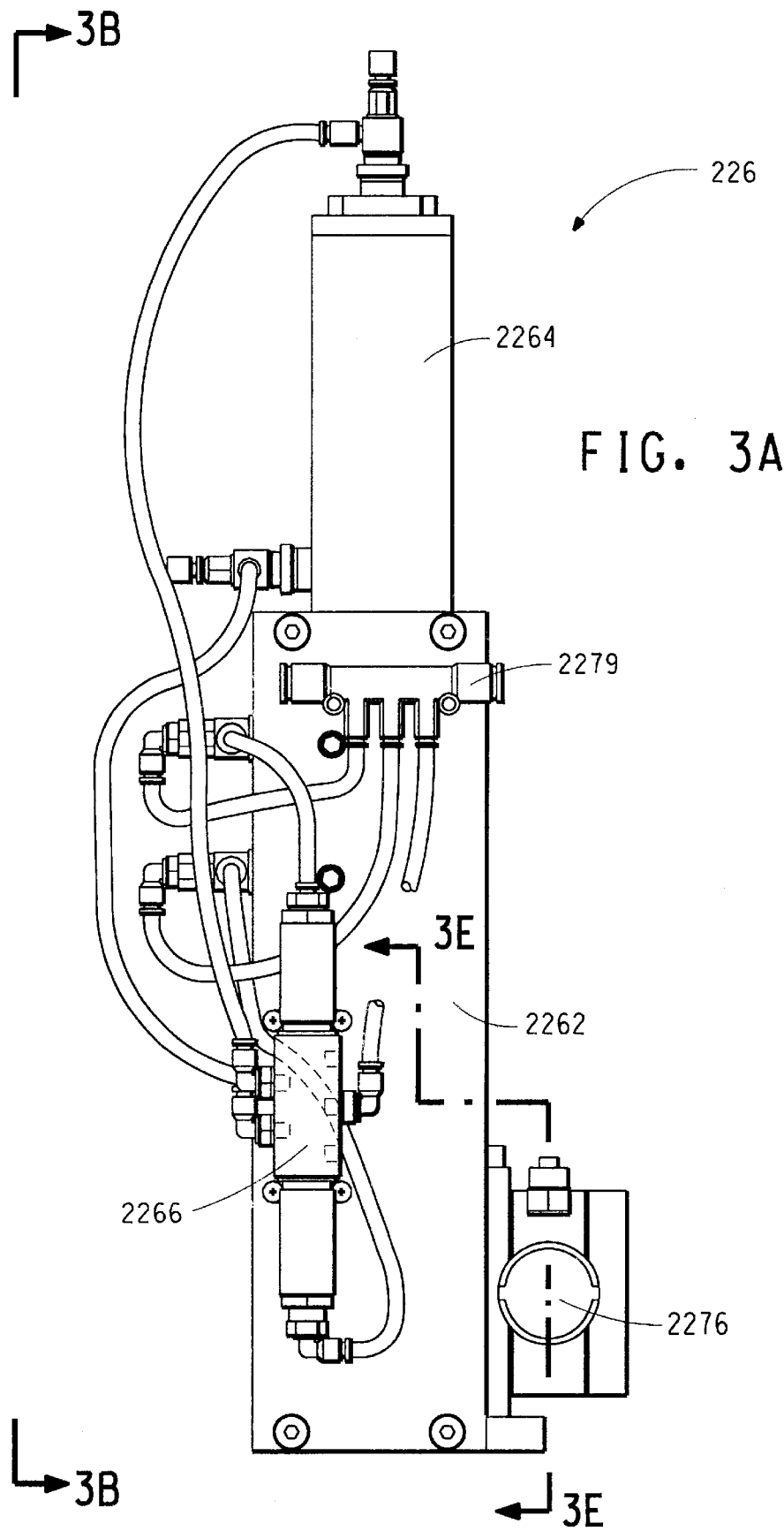

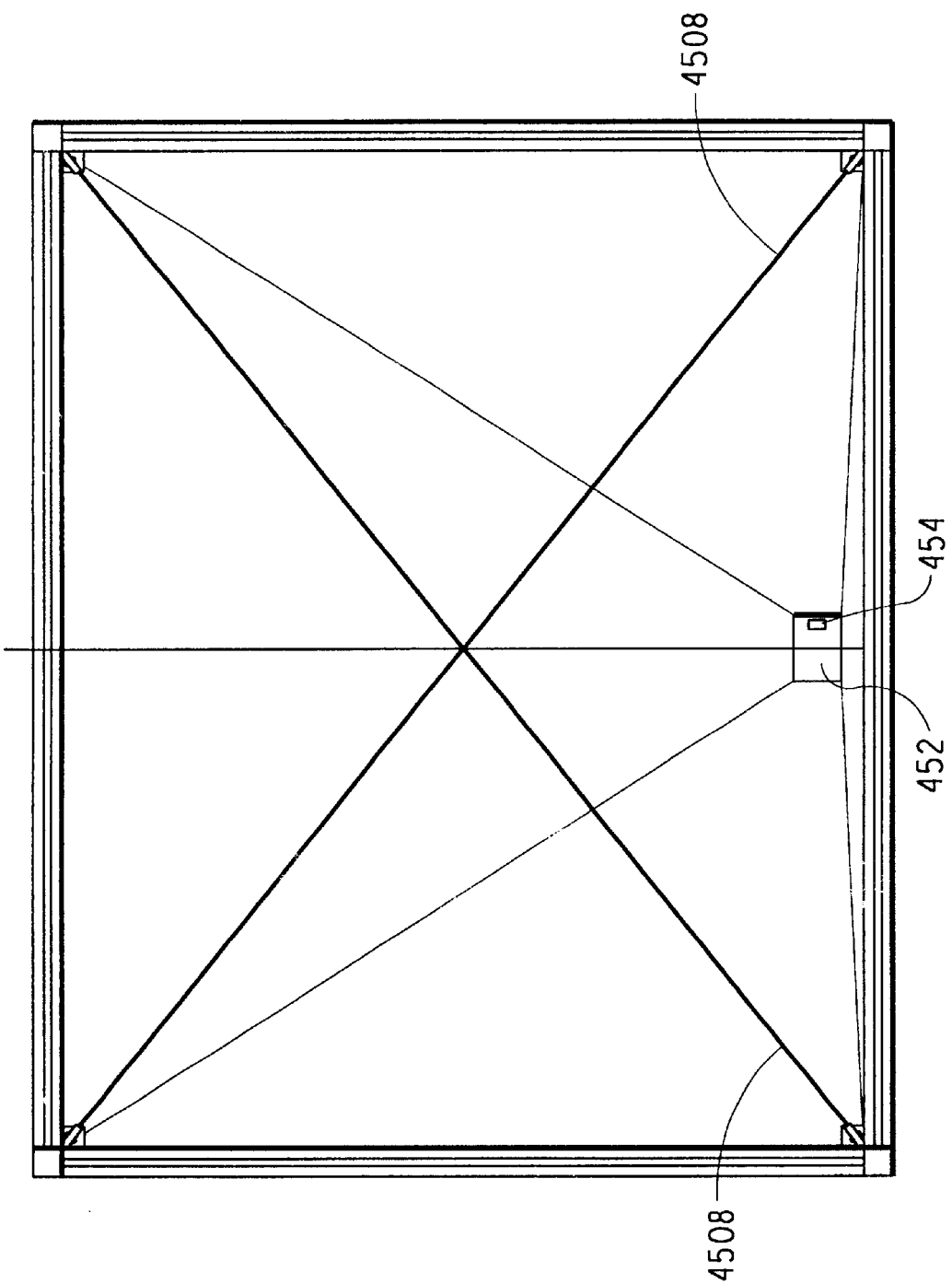

DISPENSING APPARATUS

FIELD OF THE INVENTION

The present invention is generally directed to dispensing apparatus and more particularly directed to apparatus used in gravimetrically dispensing accurate predetermined amounts of dispersants, particulates, or a combination thereof.

BACKGROUND OF THE INVENTION

Paint manufacturer is faced with the perennial problem of supplying to its customers many different colored paints and usually more colors than the manufacturer can, as a practical matter, keep in stock. The problem is especially acute in the supply of paint for vehicle refinishing, that is to say in the supply of paint for respraying vehicles, for example, a crash repair. The difficulty is that vehicle manufacturers supply their vehicles in many different colors and in subtly different shades. Even for a given make, model and color, slight variations can arise between the exact colors of particular cars due to variations in the batches of paint used in the manufacture. Also, colors fade with time due to exposure to UV radiation and new color recipes are needed to match the faded colors. Moreover, commercial transport operators often wish to respray their vehicles in their own distinctive color schemes. As a result, the number of paint colors in use is extensive and can run into tens of thousands.

Paint manufacturers succeed in providing the large number of colors called for by a method of blending. A number of basic or standard tints are produced that usually contain a single pigment but may contain a major proportion of one pigment and a minor amount of another sufficient to produce the standard color tint. A typical standard range will contain from 20 to 50 basic tints, which can be blended to give thousands of other colors. Thus, the refinisher or refinish paint supplier need only stock between 20 to 50 color tints depending upon the particular range of paints that it wishes to use.

In order to match color of the cars the refinisher repairs, the refinisher must mix these paints very carefully and very accurately against a recipe or a mixing scheme, which is supplied by the paint manufacturer. The recipe sets out the proportions of basic tints, which have to be mixed to match the exact color of the particular make, model and color variant of the repaired car.

The most conventional method is to manually weigh the components in accordance with a recipe and then mix them together to form a paint.

Automated devices have also been used. For example, dispensing devices are commonly employed in the art of paint mixing to dispense desired amounts of tints of certain color or characteristic to form paint. Typically, dispensing devices utilize a plurality of dispensing reservoirs with each reservoir having its own dispensing valve. Some of these dispensing devices are used to perform volumetric mixing; i.e. certain amounts of tints are individually dispensed by volume from their respective reservoirs. One of the major problems associated with conventional dispensing devices is the difficulty in dispensing accurate amounts of tints used to form the paint. This problem is further exacerbated when quantities of tints being dispensed are small, such as for example, in preparing refinish automotive applications.

Another problem associated with conventional dispensing devices is the phase separation of solids, such as pigments, present in the tint from a carrier medium, such as binder resin and solvent.

A number of ways have been used to dispense a plurality of components, such as dispersants or particulates in predetermined quantities, to form compositions, such as paints. U.S. Pat. No. 5,485,941 to Guyomard et al., attempts to address some of the foregoing problems by providing for pressurized containers and a loop through which flowable materials are recirculated to prevent phase separation. A pressurization fluid, such as nitrogen or air, is used to provide pressure to flowable materials. A buffer reservoir is used to transfer flowable materials under pressure. The reservoir then gravimetrically and volumetrically dispenses the flowable material through a dosing head under pressure in predetermined amounts. However, a need still exists for a simpler device that not only addresses the foregoing problems, but also ensures improved dispensing accuracy even in very small amounts of fractions of a gram.

STATEMENT OF THE INVENTION

The present invention is directed to a dispensing apparatus comprising:

(1) a plurality of recirculating systems wherein each said recirculating system comprises a reservoir containing a dispersant, a closed loop of a tubing connected to said reservoir, pumping means positioned in said loop for recirculating said dispersant to and from said reservoir at an elevated pressure, and a dispersant dispenser positioned in said loop;

(2) a frame assembly comprising:
  (a) a dispenser actuator assembly for actuating said dispersant dispenser, said assembly positioned above a platform having a weighing scale positioned thereon;
  (b) a movable table positioned between said dispenser actuator assembly and said weighing scale, said table having said dispersant dispensers of said plurality of recirculating systems positioned thereon;
  (c) a pneumatic linear positioning system for moving said movable table in X and Y directions; and (3) a controller comprising:
  (a) means for retrieving a recipe for a composition from a database, said recipe comprising predetermined quantities of said dispersants, which when mixed together result in said composition;
  (b) means for signaling said pneumatic linear positioning system to move, upon processing an address location signal from a processor, said table for engaging said actuator assembly with one of said dispersant dispensers selected in accordance with said recipe;
  (c) means for actuating said dispenser actuator assembly to open or to shut, upon processing a nozzle control signal from said processor, a nozzle on said selected dispersant dispenser to gravimetrically dispense said dispersant into a container placed on said weighing scale; and
  (d) means for generating a weight monitoring signal from said weighing scale to direct said processor to shut off said nozzle on said selected dispersant dispenser once an amount of said dispersant determined in accordance with said recipe is dispensed into said container.

The apparatus of the preset invention further comprises:
  one or more particulates metering devices positioned on said moving table wherein said means for signaling, upon processing said address location signal from said processor, direct said pneumatic linear positioning system to move said table for engaging said actuator assembly with one of said metering devices selected in accordance with said recipe comprising predetermined quantities of one or more particulates; wherein, upon processing an auger control signal from said processor, said means for actuating dispenser actuator assembly initiate or terminate gravimetric release of particulates from said selected metering device into said container; and wherein said means for generating weight monitoring signal direct said processor to terminate the release of the particulates into said container once an amount of the particulates determined in accordance with said recipe is dispersed into said container.

The present invention is also directed to a method of producing a composition comprising:

(1) recirculating a plurality of dispersants thorough recirculating systems of an apparatus wherein each said recirculating system comprises a reservoir containing said dispersant, a closed loop of a tubing connected to said reservoir, pumping means positioned in said loop for recirculating said dispersant to and from said reservoir at an elevated pressure, and a dispersant dispenser positioned in said loop;

(2) retrieving a recipe for said composition from a database, said recipe comprising predetermined quantities of said dispersants, which when mixed together result in said composition;

(3) directing a pneumatic linear positioning system of a frame assembly of said apparatus to move in X and Y directions, upon processing an address location signal from a processor of said apparatus, a movable table to engage a dispenser actuator assembly with one of said dispersant dispensers selected in accordance with said recipe, wherein said table is positioned between said dispenser actuator assembly and a weighing scale of said frame assembly, said table having a plurality of said dispersant dispensers positioned thereon;

(4) actuating said dispenser actuator assembly to open or to shut, upon processing a nozzle control signal from said processor, a nozzle on said selected dispersant dispenser to gravimetrically dispense said dispersant into a container placed on said weighing scale; and (5) generating a weight monitoring signal from said weighing scale to direct said processor to shut said nozzle on said selected dispersant dispenser once an amount of said dispersant determined in accordance with said recipe is dispensed into said container.

The forgoing method further comprising:

(1) directing, upon processing said address location signal from a processor, said pneumatic linear positioning system to move said table for engaging said actuator assembly with one of one or more particulates metering devices positioned on said moving table, said metering device selected in accordance with said recipe comprising predetermined quantities of one or more particulates; and (2) actuating said dispenser actuator assembly to initiate or to terminate, upon processing an auger control signal from said processor, gravimetric release of particulates from said selected metering device into said container, wherein said means for generating said weight monitoring signal direct said processor to terminate the dispensing of said particulates into said container once an amount of said particulates determined in accordance with said recipe, is dispensed into said container.

An advantage of the present invention is to provide a smooth, steady (no pulsing) flow of the dispersant through the nozzle of the dispersant dispenser.

The present inventions advantageously provides for a 3-mode dispensing capability that provides a fast mode for dispensing the bulk of the dispersants or particulates and thereby reduce the cycle time, and slow and jog modes for increased dispensing accuracy.

BRIEF DESCRIPTION OF THE DRAWINGS

FIG. 3A shows pumping means of a recirculation system of the apparatus and FIG. 3B shows another view thereof seen along the direction 3B—3B of FIG. 3A.

FIG. 3C shows the details of switching valves of the pumping means seen in the direction 3C—3C of FIG. 3B.

FIG. 4A shows the dispenser with a nozzle in a closed position and FIG. 4B shows dispenser with the nozzle in an open position.

FIG. 8 shows a partial plan view of the frame assembly displaying a drip pan.

DESCRIPTION OF THE PREFERRED EMBODIMENT

As used herein:

"Dispersants" mean any components of a composition that are flowable enough to be readily conveyed under pressure, such as, for example, tints, solvents, binder polymers, and dispersed pigments used in producing automotive refinish paints.

"Particulates" mean any solid components of a composition, such as, for example, aluminum flakes or mica used in producing an automotive metallic refinish paint.

Figure 1:
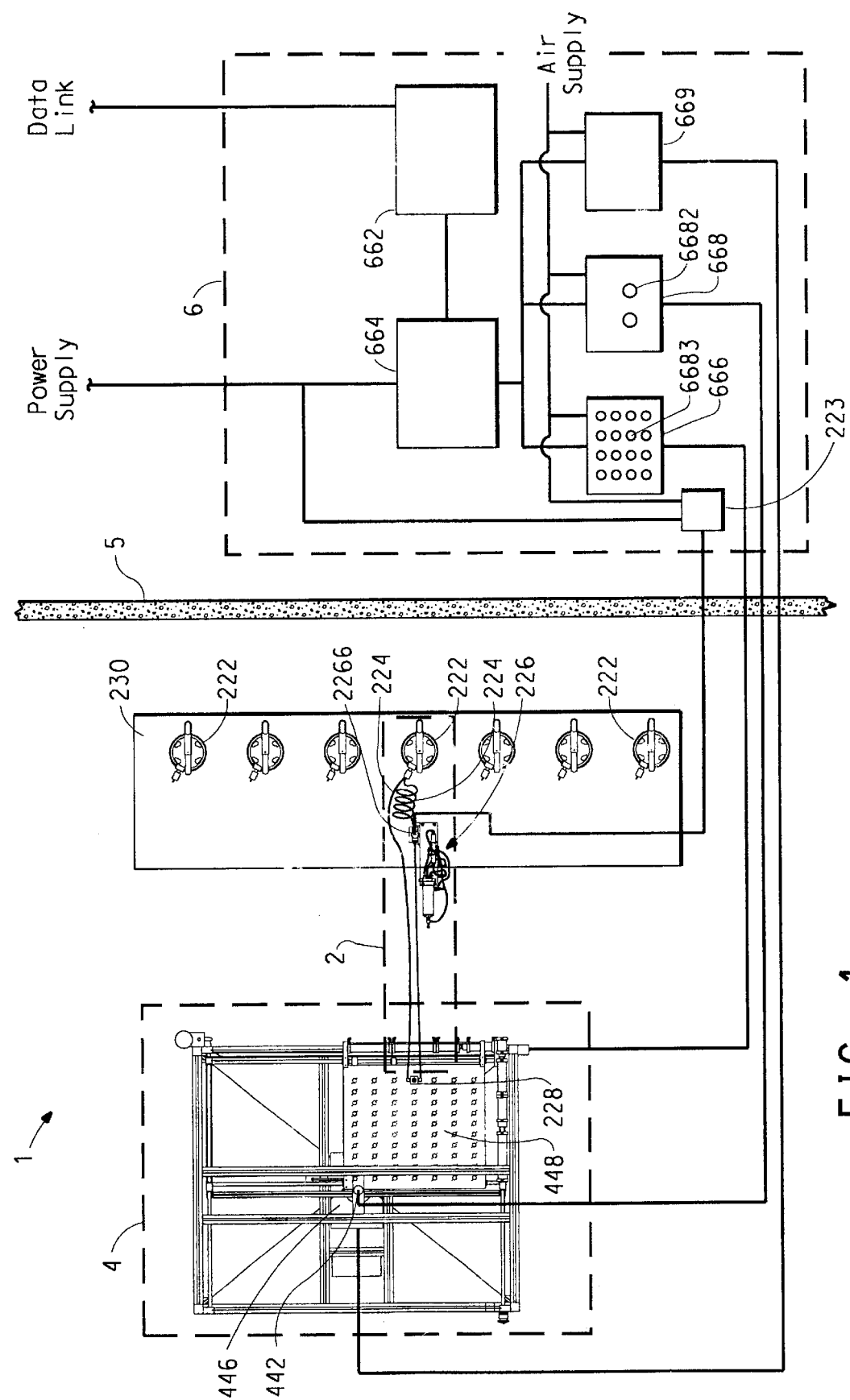
FIG. 1 shows the schematic representation of the apparatus of the present invention.

In its broadest aspects, the dispensing apparatus of the present invention identified as 1 in FIG. 1 includes a plurality of recirculating systems 2, a frame assembly 4 and a controller 6.

Figure 2:
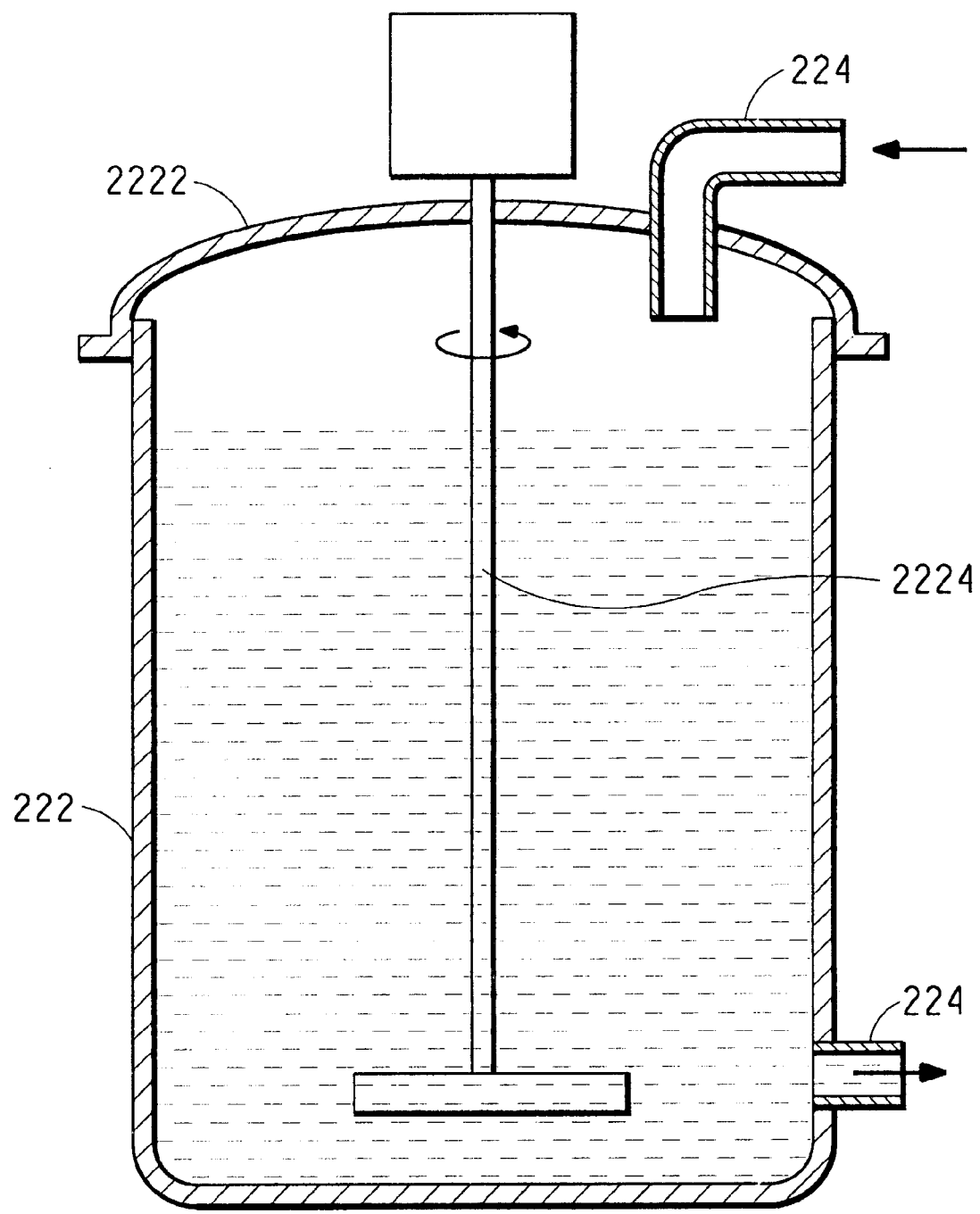
FIG. 2 shows a cross-section of a reservoir.

Each recirculating system 2 includes a reservoir 222 containing a dispersant, a closed loop of a tubing 224 connected to reservoir 222, pumping means 226 positioned in a closed loop of tubing 224 for recirculating the dispersant to and from reservoir 222 at an elevated pressure, and a dispersant dispenser 228 positioned in the loop. As seen in FIG. 2, each reservoir 222 is capped with a sealable lid 2222 and an intake of tubing 224 is preferably placed near the bottom of reservoir 222 and a drain of tubing 224 back into reservoir 222 is preferably positioned near lid 2222 of reservoir 222. Suitable tubing is chemically inert to the dispersant passing therethrough and is preferably flexible and bendable. Inner diameter of tubing 224 should be large enough to permit smooth flow of the dispersant at the desired elevated pressure. The intake of tubing 224 having 6.35 mm (¼ inches) inner diameter is preferred. The drain tubing 224 of a smaller diameter of 4.76 mm (3/16 inches) is preferred. The smaller drain tubing 224 provides additional resistance to flow, thereby creating a back pressure in the recirculation loop. Such a back pressure provides increased dispersant pressure at dispersant dispenser 228, which aids in the dispensing of the dispersant at a constant rate. Tubings made of Teflon® fluropolymers supplied by Parker-Hannifin Corporation, Ravenna, Ohio are particularly suitable. Preferably, a plurality of reservoirs 222 and pumping means 226 are placed on a rack assembly 230. Reservoir 222 can be cans filled with a dispersant, such as tint, supplied by a paint manufacturer. If desired, these cans can be modified to connect the intake and drain of tubing 224.

As seen in FIG. 2, reservoir 222 is preferably provided with a motor operated conventional agitator 2224 to maintain the dispersants in an agitated state for preventing settling of solids, which can be present in the dispersants. Reservoir lid 2222 and agitator 2224 can be any conventional mixing lid, such as the Elite Model supplied by Dedoes, Industries of Walled Lake, Mich. Rack assembly 230 can be any conventional rack, such as Model J-88 or Alliance Model supplied by Dedoes, Industries. Controller 6 generally includes circulation timers 223 to independently control recirculations of the dispersants in recirculating systems 2 such that the dispersants can be continuously or intermittently circulated through recirculating systems 2. Circulation timer 223 can be any conventional timer, such as Model #700-HX86SA17 supplied by Allen-Bradley of Milwaukee, Wis. and a pneumatic solenoid valve that turns "on" or "off" the air supply to recirculating systems 2. Controller 6 also generally includes an agitation timer to independently control agitations of the dispersants in reservoirs 222 such that the dispersants can be continuously or intermittently agitated in reservoirs 222. Generally, the agitation timers are similar to circulation timers. The recirculation and the agitation of the dispersant typically depend upon the amount of solid components present in the dispersant. Typically, 20 to 30 minutes of recirculation is employed every 3 or 4 hours. Similarly agitators 2224 can be turned on and off along with the recirculation of the dispersants in recirculating systems 2. As a result, the homogeneity of the components present in the dispersant can be maintained and changes in tint strength of the dispersant due to pigment settling are prevented.

FIGS. 3A, 3B, 3C, 3D and 3E show the details of pumping means 226. A low-pulse double-acting piston pump 2260 affixed to a metal frame 2262 is operated by a double acting air cylinder 2264, such as Model 242-D, 34.93 mm (1⅜ inch) bore, 50.8 mm (2 inch) stroke supplied by Bimba, Monee, Ill. Air cylinder 2264 is positioned on frame 2262. The air supply to operate air cylinder 2264 is routed through a four-way power valve 2266, such as a Model FV-5D supplied by Clippard of Cincinnati, Ohio. Limit switches 2268A and 2268B send air to the pilot ports in power valve 2266 when a switching disc 2270, positioned on mated piston rod 2272 and air cylinder rod 2274, contacts one of limit switches 2268A and 2268B. The pilot ports switch in power valve 2266 change the direction of the movement of cylinder 2264. Thus, as air cylinder rod 2274 of cylinder 2264 pushes piston rod 2272 in the direction of the arrow (FIG. 3D), switching disc 2270 hits switching valve 2268B, thereby switching the air supply to cylinder 2264. As a result, air cylinder rod 2274 of cylinder 2264 pulls piston rod 2272 in the opposite direction of the arrow to finally hit switching valve 2268A, which switches the air supply to reverse the cycle. Surge suppressor 2276 helps in reducing pressure fluctuations in the dispersant being recirculated at the elevated pressure through recirculating system 2. An air manifold 2279 distributes air to various air switching points. Suitable switching valves 2268A and 2268B can be those supplied by Humphrey, Kalamazoo, Mich. (Model 3P).

Figures 3B, 3C:
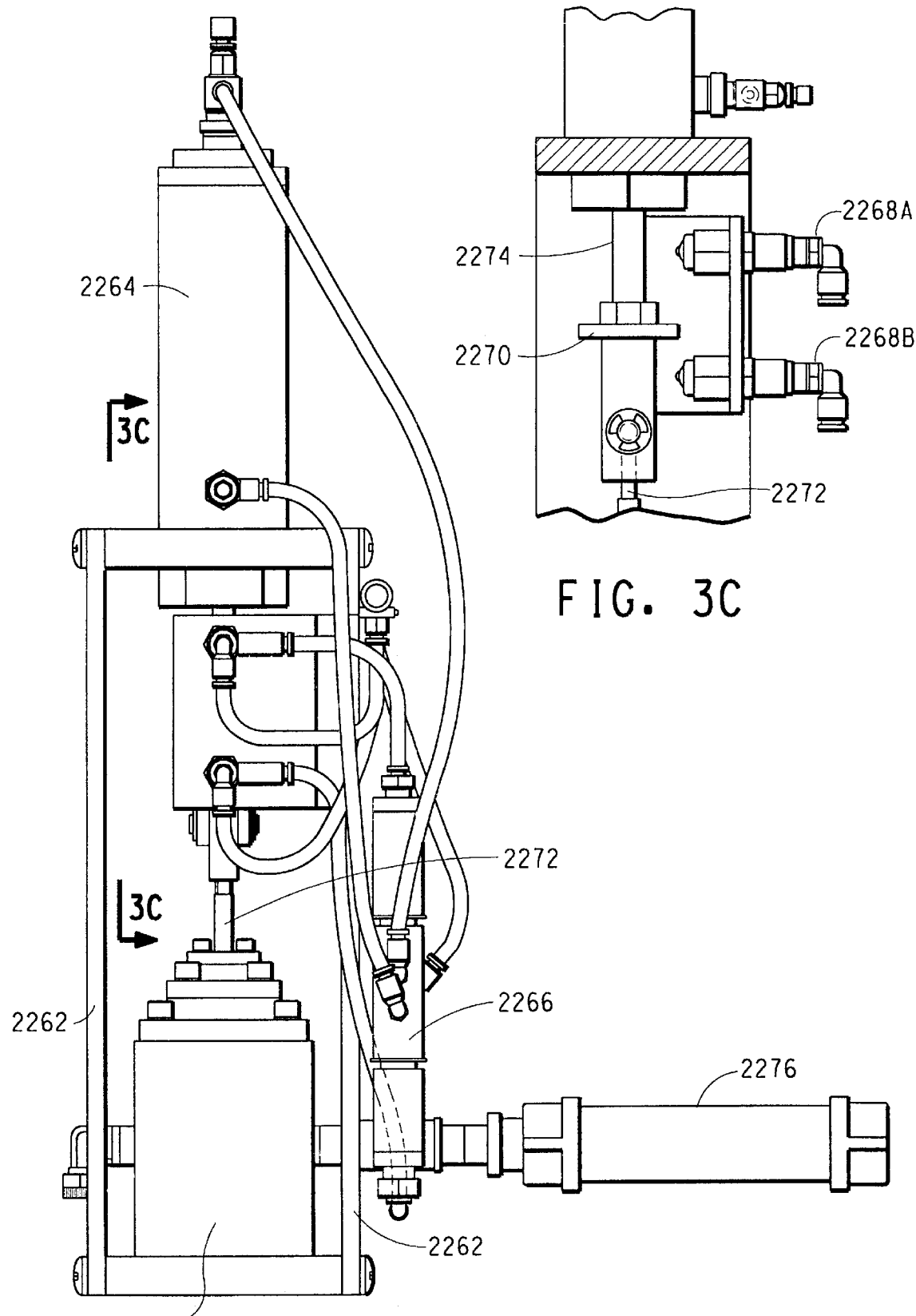
Figure 3D:
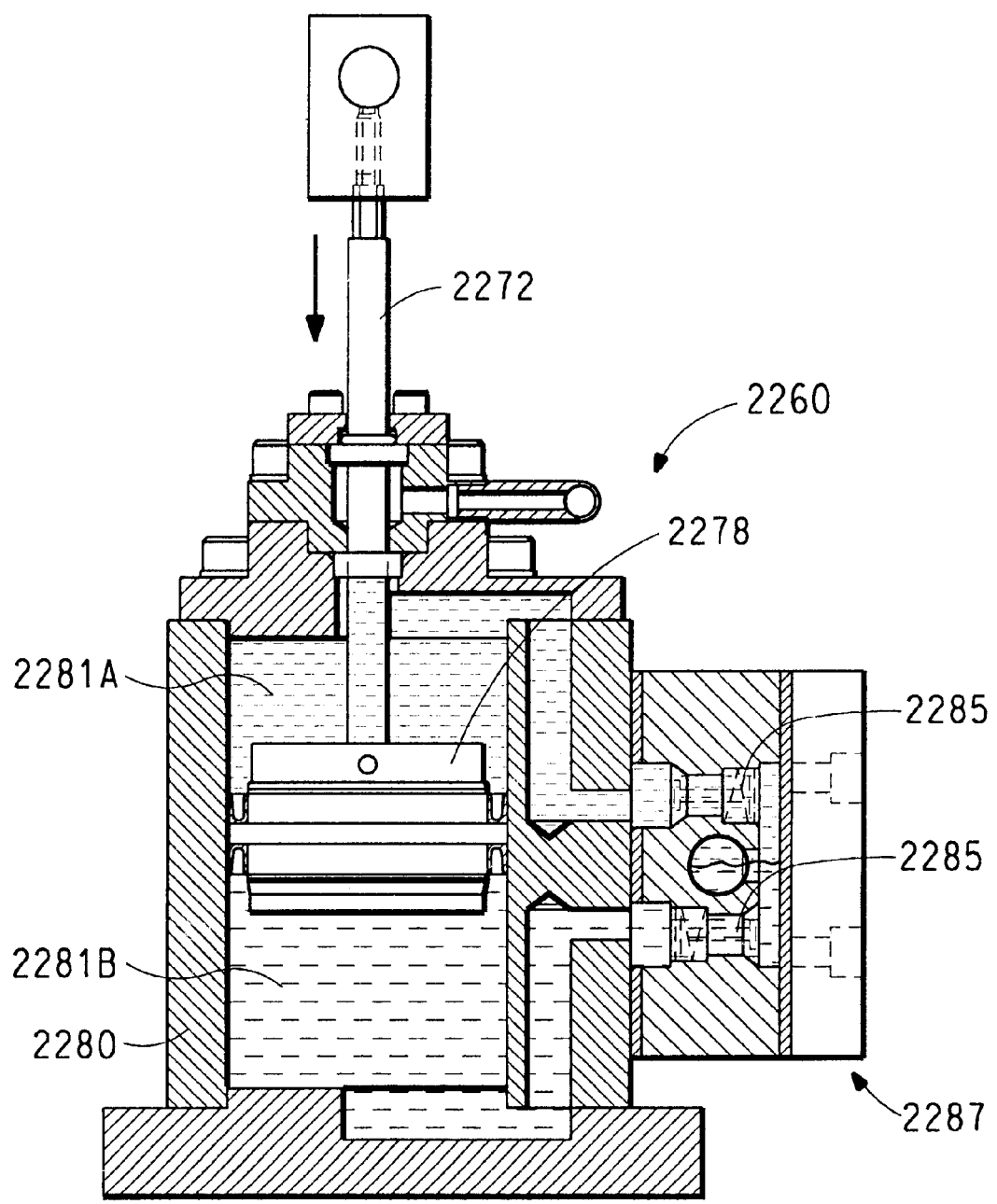
FIG. 3D shows a cross-sectional elevation taken along the cross-section line 3D—3D of FIG. 3E of a low-pulse double-acting piston pump of the pumping means.
Figure 3E:
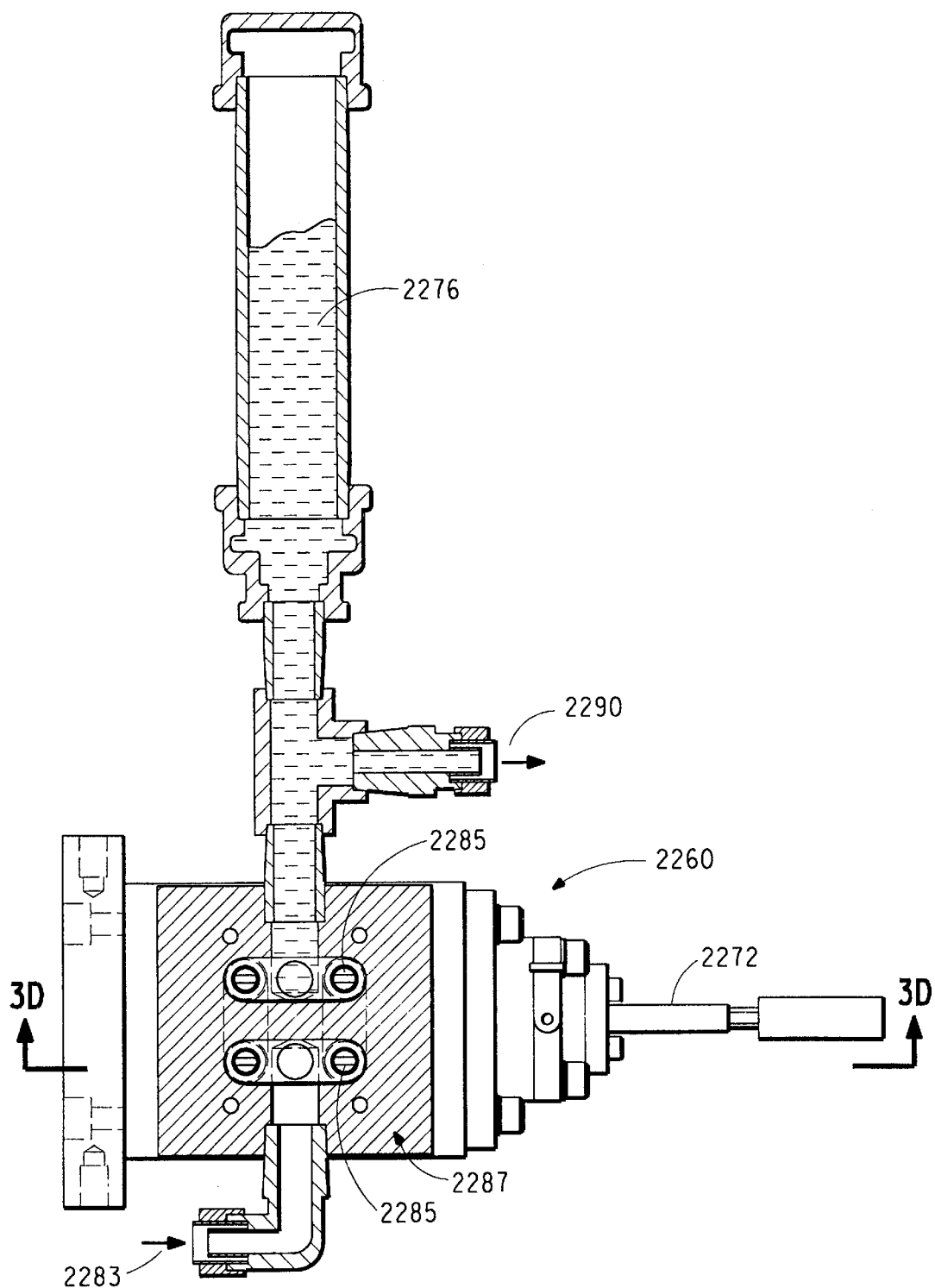
FIG. 3E shows a cross-sectional elevation taken along the cross-section line 3E—3E of FIG. 3A of the low pulse double acting piston pump and a surge suppressor of the pumping means.

FIGS. 3D and 3E show the details of the actions taking place in piston pump 2260. As piston rod 2272 is pushed in the direction of the arrow in FIG. 3D by air cylinder rod 2274 of air cylinder 2264, a piston head 2278 slidably and sealably positioned inside an enclosed piston sleeve 2280 also moves in the direction of the arrow. As piston head 2278 moves in the direction of the arrow, lower pressure is created in an intake zone 2281A. This lower pressure pulls in the dispersant through an intake port 2283 via a series of one-way valves 2285 in a manifold 2287. Simultaneously, piston head 2278 applies pressure on the dispersant present in a delivery zone 2281A to deliver the dispersant under pressure though a delivery port 2290 via series of one way valves 2285 of manifold 2287. When piston rod 2272 reverses its direction, delivery zone 2281A then becomes an intake zone to now bring the dispersant into that zone via intake port 2283 to repeat the cycle. Typically, the dispersant is circulated through recirculating system 2 at elevated pressures ranging from 0.34 to 4.76 bars (5 to 70 psig) at a flow rate of 200 to 250 milliliters per minute. However, depending on the use, the invention contemplates higher or lower flow rates or pressures in recirculation system 2. From FIG. 3E, it can be seen that as the dispersant is delivered to port 2290, air pocket inside surge suppresser 2276 is compressed by the dispersant under pressure. When piston head 2278 switches the direction of travel, for a moment the pressure in recirculation system 2 can drop. At which point, however, the compressed air pocket from surge suppresser 2276 provides the needed boost pressure to prevent a pressure fluctuation in recirculating system 2. The unique "low-pulse double-acting" design of piston pump 2260 results in very low pump pulsations, which are further, dampened by the "inverted pipe" type surge suppressor 2276. As a result, a very even pulse free recirculation of the dispersant though recirculating system 2 is maintained, which helps in dispensing a precise amount of the dispersant required by the recipe. Moreover, unlike conventional systems in which the recirculation of the dispersant stops when dispensing from the nozzle begins, the recirculation of the dispersant in the present invention continues even during the dispensing of the dispersant.

Figure 4A:
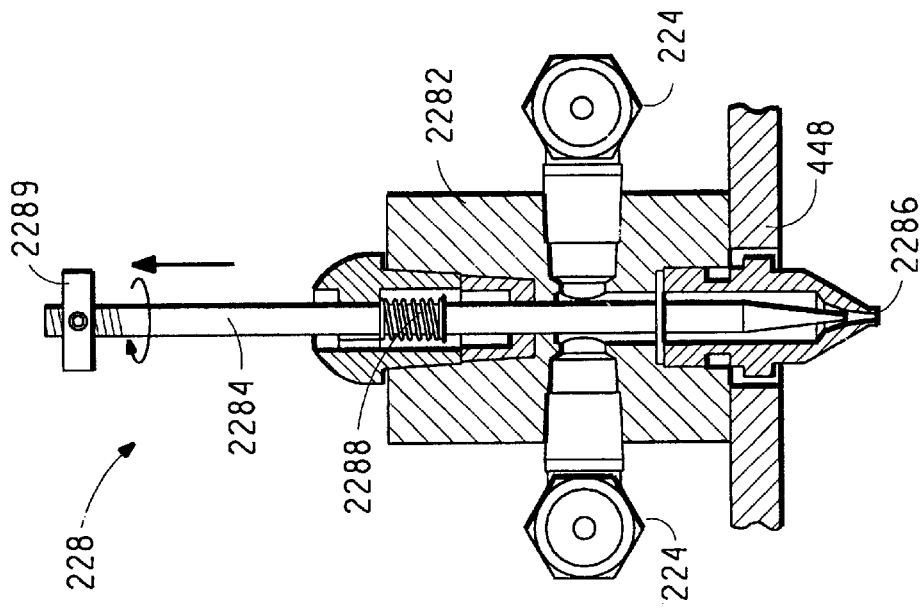
FIGS. 4A and 4B show a cross-section of a dispenser positioned on the moving plate.
Figure 4B:
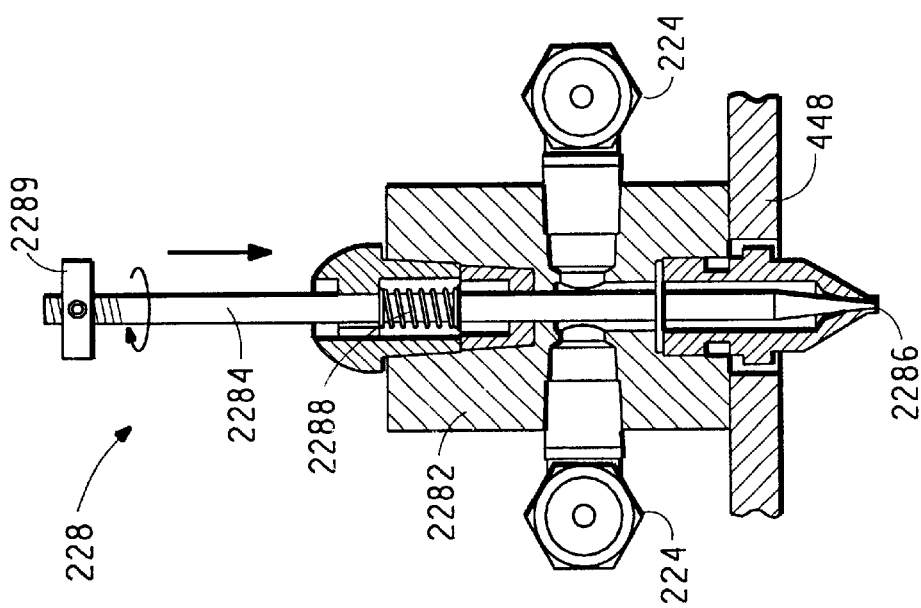

As shown in FIG. 1, a plurality of dispersant dispensers 228 is positioned on a movable table 448 of frame assembly 4. FIGS. 4A and 4B show the details of dispenser 228. Tubing 224 is connected to a body 2282 of dispenser 228 to allow the dispersant to flow through dispenser 228. A needle valve 2284 is normally kept in a closed position as shown in FIG. 4A against a seat of a nozzle 286 by a biasing means, such as a spring 2288. As needle valve 2284 is raised (noted by the direction of an arrow in FIG. 4B) by lifting of a threaded valve head 2289, nozzle 2286 opens and the dispersant, which is under pressure, flows out gravimetrically. The components of dispersant dispenser 228 are made of chemically inert material, such as for example, stainless steel.

In order to improve the dispensing accuracy, needle valve 2284 and its mating seat in nozzle 2286 are tapered to accurately control delivery of the dispersant through nozzle 2286. The opening of nozzle 2286 in a "nozzle open" mode, is increased or decreased by turning the threaded portion of valve head 2289. As a result, the rate of the dispersant being discharged can be controlled. Needle valve 2284 can be raised fully in a "fast-fill" mode, partially in a "slow-fill" mode. Furthermore, needle valve 2284 can be rapidly raised and lowered in a "jog-fill" mode to dispense droplets of the dispersants for dispensing accurate amounts of the dispersants, typically just before the dispensing step is accomplished. The "Jog On" (needle valve open) time can be adjusted in milliseconds to change the size of the dispensed droplet and improve the dispensing accuracy. Thus, the tapered needle configuration of dispenser 228 can dispense amounts as low as 0.01 grams within accuracy ranging from ±0.001 to ±0.01 grams. However, it is understood that the foregoing accuracy would be affected by the properties, such as viscosity and surface tension, of the dispersants. The foregoing configuration advantageously allows the dispersant to recirculate, thus preventing the settling of solid components in the dispersants while still allowing accurate dispensing of the dispersants on demand. As stated earlier, the intake of tubing 224 having a smaller diameter than the drain tubing 224 is preferred. As a result, a back pressure is created to ensure continuous dispensing of the dispersant when nozzle 2286 is in "open position".

FIGS. 5, 6, 7 and 8 show the details of frame assembly 4, which in its broadest aspects includes a dispenser actuator assembly 442 for actuating a selected dispersant dispenser 228, a platform 444 having a weighing scale 446 positioned thereon, a movable table 448 positioned between dispenser actuator assembly 442 and weighing scale 446 and a pneumatic linear positioning system 450 for moving movable table 448 in X and Y directions.

Dispenser actuator assembly 442 is preferably positioned at the center of frame assembly 4 on two or more parallel rails. Actuator assembly 442 is provided with an actuator clamp 4422, which is shaped to allow ready engagement and disengagement of valve head 2289 of selected dispenser 228. Clamp 4422 is preferably "C" shaped to ride over valve head 2289 for engagement. However, it is contemplated that clamp 4422 having other suitable shapes can be also employed. Generally, clamp 4422 is fabricated from a rigid inert material, such as aluminum or stainless steel. Dispenser actuator assembly 442 includes an actuator clamp operator 4424 that operates actuator clamp 4422. One example of actuator clamp operator 4424 is a conventional 3-position twin-piston air cylinder such as 19.5 mm (¾ inch) bore Model 00672A supplied by Springville, of Springville, N.Y., having "0" position (closed), "⅛" position (slow-fill mode) and "¼" position (fast-fill mode). Actuator clamp operator 4424 is provided with biasing means, such a compression spring, installed on a piston rod of operator 4424 to normally keep operator 4424 in "0" position in the absence of air supply to operator 4424.

A rigid dampened platform 444 is located directly below actuator assembly 442. Platform 444 is preferably well supported by twin parallel beams or 4 metal posts anchored to the ground to prevent vibrations affecting the accuracy of weighing scale 446 positioned on top of platform 444. If desired, platform 444 may include a dampening block of dense granite to further dampen any vibration. Any suitable weighing scale can be used. For example, a 2200-gram capacity weighing scale (Model FC2CCE-SX supplied by Sartorius of Edgewood, N.Y.) having a minimum division of 0.01 g is well suited.

Movable table 448 is positioned between dispenser actuator assembly 442 and weighing scale 446. Table 448 is preferably planar having dispersant dispensers 228 of plurality of recirculating systems 2 positioned on it. Preferably, table 448 is made of rigid inert material, such as stainless steel or aluminum. By way of example, table 448 is provided with a matrix of 70 locations on which 70 dispersant dispensers 228 can be mounted. Each location on the matrix on table 448 has an address, which can be referenced via controller 6. All the locations on table 448 are preferably equidistant in X and Y directions and are sufficiently apart from each other to allow easy movement of table 448 without interference with actuator assembly 442 or dispensers 228 mounted on table 448. Table 1 below shows an example of the matrix on table 448 with 70 locations. As shown in FIGS. 4A and 4B, nozzle 2286 of each dispenser 228 projects below table 448 through an opening provided at each of these locations on table 448 that correspond to the matrix locations.

TABLE 1

| Nozzle | Position Status of Cylinders 4504 and 4506 | | | | | | | |
|---|---|---|---|---|---|---|---|---|
| 2286 | X1 | X2 | X3 | X4 | Y1 | Y2 | Y3 | Y4 |
| A1 | R | R | R | R | E | R | R | R |
| A2 | R | R | R | R | R | E | R | R |
| A3 | R | R | R | R | R | R | E | R |
| A4 | R | R | R | R | R | R | R | E |
| A5 | R | R | R | R | E | R | R | E |
| A6 | R | R | R | R | R | E | R | E |
| A7 | R | R | R | R | E | E | R | E |
| A8 | R | R | R | R | E | R | E | E |
| A9 | R | R | R | R | R | E | E | E |
| A10 | R | R | R | R | E | E | E | E |
| B1 | E | R | R | R | E | R | R | R |
| B2 | E | R | R | R | R | E | R | R |
| B3 | E | R | R | R | R | R | E | R |
| B4 | E | R | R | R | R | R | R | E |
| B5 | E | R | R | R | E | R | R | E |
| B6 | E | R | R | R | R | E | R | E |
| B7 | E | R | R | R | E | E | R | E |
| B8 | E | R | R | R | E | R | E | E |
| B9 | E | R | R | R | R | E | E | E |
| B10 | E | R | R | R | E | E | E | E |
| C1 | R | R | E | R | E | R | R | R |
| C2 | R | R | E | R | R | E | R | R |
| C3 | R | R | E | R | R | R | E | R |
| C4 | R | R | E | R | R | R | R | E |
| C5 | R | R | E | R | E | R | R | E |
| C6 | R | R | E | R | R | E | R | E |
| C7 | R | R | E | R | E | E | R | E |
| C8 | R | R | E | R | E | R | E | E |
| C9 | R | R | E | R | R | E | E | E |
| C10 | R | R | E | R | E | E | E | E |
| D1 | E | R | E | R | E | R | R | R |
| D2 | E | R | E | R | R | E | R | R |
| D3 | E | R | E | R | R | R | E | R |
| D4 | E | R | E | R | R | R | R | E |
| D5 | E | R | E | R | E | R | R | E |
| D6 | E | R | E | R | R | E | R | E |
| D7 | E | R | E | R | E | E | R | E |
| D8 | E | R | E | R | E | R | E | E |
| D9 | E | R | E | R | R | E | E | E |
| D10 | E | R | E | R | E | E | E | E |
| E1 | R | R | E | E | E | R | R | R |
| E2 | R | R | E | E | R | E | R | R |
| E3 | R | R | E | E | R | R | E | R |
| E4 | R | R | E | E | R | R | R | E |
| E5 | R | R | E | E | E | R | R | E |
| E6 | R | R | E | E | R | E | R | E |
| E7 | R | R | E | E | E | E | R | E |
| E8 | R | R | E | E | E | R | E | E |
| E9 | R | R | E | E | R | E | E | E |
| E10 | R | R | E | E | E | E | E | E |

TABLE 1-continued

| Nozzle | Position Status of Cylinders 4504 and 4506 | | | | | | | |
|---|---|---|---|---|---|---|---|---|
| 2286 | X1 | X2 | X3 | X4 | Y1 | Y2 | Y3 | Y4 |
| F1 | E | R | E | E | E | R | R | R |
| F2 | E | R | E | E | R | E | R | R |
| F3 | E | R | E | E | R | R | E | R |
| F4 | E | R | E | E | R | R | R | E |
| F5 | E | R | E | E | E | R | R | E |
| F6 | E | R | E | E | R | E | R | E |
| F7 | E | R | E | E | E | E | R | E |
| F8 | E | R | E | E | E | R | E | E |
| F9 | E | R | E | E | R | E | E | E |
| F10 | E | R | E | E | E | E | E | E |
| G1 | E | E | E | E | E | R | R | R |
| G2 | E | E | E | E | R | E | R | R |
| G3 | E | E | E | E | R | R | E | R |
| G4 | E | E | E | E | R | R | R | E |
| G5 | E | E | E | E | E | R | R | E |
| G6 | E | E | E | E | R | E | R | E |
| G7 | E | E | E | E | E | E | R | E |
| G8 | E | E | E | E | E | R | E | E |
| G9 | E | E | E | E | R | E | E | E |
| G10 | E | E | E | E | E | E | E | E |

In Table 1 above, letters A through G designates rows and numerals 1 through 10 designate the dispenser locations within in each row.

Figure 5:
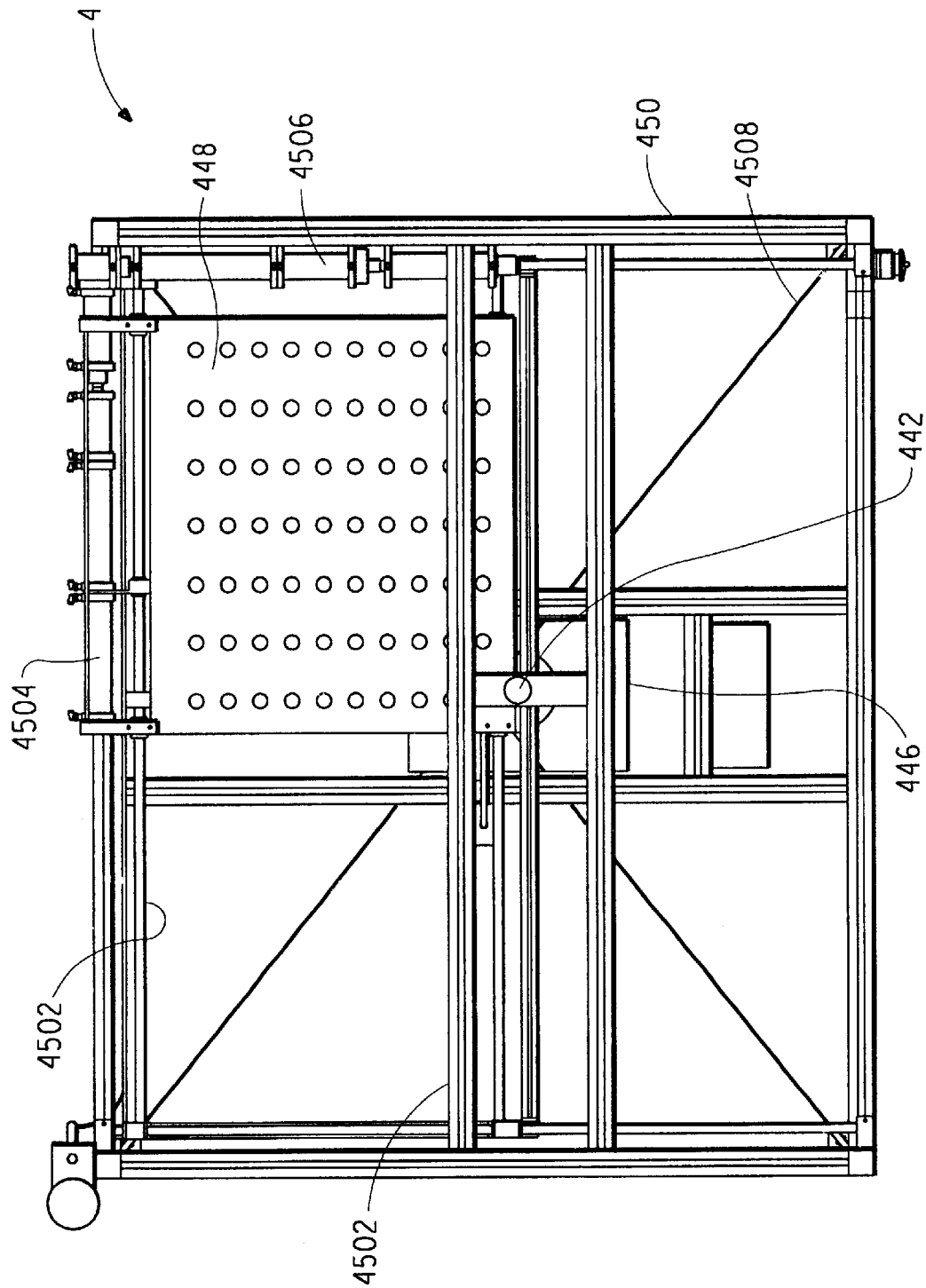
FIG. 5 shows the plan view of a frame assembly of the apparatus with a moving plate at home position.
Figure 6:
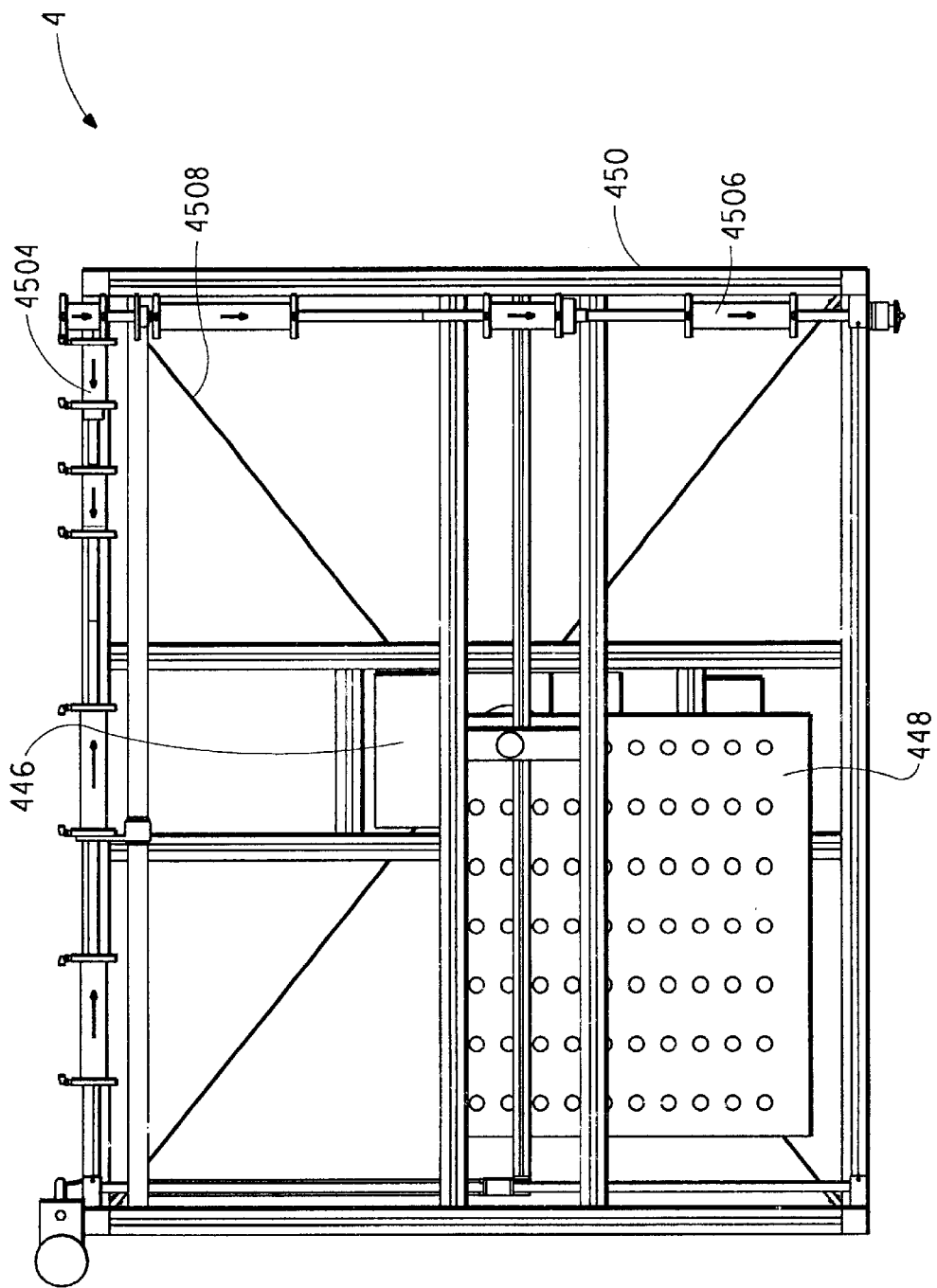
FIG. 6 shows the plan view of the frame assembly with the moving plate positioned at the opposite end from the home position.

As shown in FIGS. 5 and 6 pneumatic linear positioning system 450 includes a movable framework 4502 connected to a plurality of X pneumatic cylinders 4504 mounted on frame assembly 4, and a plurality of Y pneumatic cylinders 506 connected to movable table 448 and mounted on movable framework 4502. X and Y pneumatic cylinders 4504 and 4506 are preferably of different fixed stroke lengths such that by extending or retracting one or more of these cylinders, movable table 448 can be moved to an address on movable table 448 that corresponds to the selected dispersant dispenser 228. By utilizing air-operated cylinders to move table 448 in X and Y directions, apparatus 1 can be used safely in the presence of volatile and flammable solvents. For example to move table 448 to any of 70 locations shown in Table 1 above, X-pneumatic cylinders 4504 include two 88.9 mm (3 ½ inch) stroke cylinders (models F0173.5 GMTY and 3RGY) and two (7 inch) stroke air cylinders (Models F0177 GMTY and GY) and Y-pneumatic cylinders 4506 include one (2 inch) stroke cylinder (model F0172 GMTY), one four inch stroke cylinder (model F0174-3 RGY), one six inch stroke air cylinder (Model F0176 GY) and one 203.3 mm (8 inch) stroke air cylinder (Model F0178GMTY) all having 38.1 mm (1.5 inch) bore, and all supplied by Bimba, Monee, Ill. Movable framework 4502 is preferably made of rigid, lightweight metal frame made of aluminum or stainless steel.

To prevent accidental positioning of table 448, apparatus 1 is further provided with interlocks. Before table 448 is moved along X axis, means 666 for positioning direct movable frame work 4502 to move to a home position shown in FIG. 5. Once framework 4502 moves into the home position, it contacts a "Y"-axis interlock positioned in a corner on framework 4502. Series of metal pegs aligned with each row are positioned on movable framework 4502 along X-axis. An "X" axis sensor is provided on movable framework 4502 to sense the presence of the peg as movable framework travels along the X-axis. If the "X" axis sensor fails to sense the presence of the peg, it sends a signal to means 666 for positioning to prevent any movement table 448 along Y axis, thereby preventing accidental damage to clamp 4422 and needle valve 2284. A pneumatic gap sensor, such as, Model 1030 supplied by Clippard of Cincinnati, Ohio is well suited for use as "X" axis sensor and a 3-port, 2-position pneumatic valve (Model 3P) supplied by Humphrey of Kalamazoo, Mich. is well suited as the "Y" axis interlock.

Alternatively, it is within the ambit of the present invention to raise the height of the structure supporting actuator assembly 442, and correspondingly extending the travel of operator 4424. Thus, during the movement of table 448, clamp 4422 is kept clear of valve head 2289. As a result, table 448 could be moved in any direction, including diagonally, without damaging clamp 4422 or valve head 2289. Still another alternative would be to move table 448 after disengaging clamp 4422 from valve head 2289, then retracting clamp 4422 above valve head 2289 and then moving table in any direction, including diagonally, without damaging clamp 4422 or valve head 2289.

If desired, movable framework 4502 can be provided with a wire cable guide assembly 4508 to prevent jamming of movable framework 4502 during motion in the X or Y-direction. If desired, frame assembly 4 can be also provided with a safety door, which has to be kept closed for apparatus 1 to operate.

FIG. 1 shows the broadest aspects of controller 6 of apparatus 1. Controller 6 includes means 662 for retrieving a recipe from a database for a composition that is being dispensed by apparatus 1. The recipe comprises predetermined quantities of the dispersants, which when mixed together result in the composition. Typically, means for retrieving 662 are a conventional data retrieval system of a conventional computer through which the recipe is retrieved from a database accessed from a suitable data storage device, such as a CD-ROM, floppy disc, server, website or a remote area located in other part of the plant where apparatus 1 is situated. However, the remote area can be some distance away, such as for example, another part of a city, another city, state or a country. It is contemplated that the recipe from the database can be accessed by entering an identifier associated with the recipe, such as, for example, a vehicle identification number (VIN) of an automobile when the recipe is for an automotive paint. Alternatively, the recipe from the database could be accessed by other conventional means, such as by running a barcode reader over a recipe identifier bar code. The retrieved recipe is conventionally downloaded into a processor 664, which is a conventional computer, such as Model No. Dimension™ 4100 supplied by Dell Computers located in Austin, Tex. utilizing Windows® 2000 operating system supplied by Microsoft Corporation located in Redmond, Wash. Alternatively, operator can manually enter the recipe into processor 664.

Controller 6 includes means 666 for signaling pneumatic linear positioning system 450 to move, upon processing an address location signal from processor 664, table 448 in the X and Y directions for engaging actuator assembly 442 with one of dispersant dispensers 228 selected in accordance with the recipe. Means 666 for signaling are also used to position movable table 448 in the home position, which is shown in FIG. 5. Each "X" and "Y" cylinder is individually controlled by a valve 6683 positioned in means 666. One example of valve 6683 includes Nugget 40, 5-port, 3-position, 24 VDC, double solenoid valve assembly (Model No. V096611A-B313A) supplied by Norgren of Littleton, Colo. Valve 6683 supplies air to each X" or "Y" cylinder to either retract or extend position. Sixteen valves 6683 are employed in the preferred embodiments shown in FIG. 1.

Controller 6 includes means 668 for actuating dispenser actuator assembly to open or to shut, upon processing a nozzle control signal from processor 664, nozzle 2286 on selected dispersant dispenser 228 to gravimetrically dispense the dispersant into a container 4462 placed on weighing scale 446. Means 668 for actuating dispenser actuator assembly include two actuator clamp operator valves 6682 that operate actuator clamp operator 4224 of actuator assembly 442. One of actuator clamp operator valves 6682 is used to move clamp 4422 by "⅛" (slow-fill mode) and the other is used to move clamp by "¼" (fast-fill mode). One example of actuator clamp operator valve 6682 is a conventional 5-port, 3-position, 24 VDC, double solenoid valve supplied by Norgren of Littleton, Colo. (Model V096611A-B313A). The nozzle control signal from processor 664 energizes either of valves 6682, which in turn controls the travel of actuator clamp operator 4224 to provide the aforestated three-positions to actuator clamp operator 4224. As a result, when clamp 4422 engages valve head 2289 connected to needle valve 2284 of dispersant dispenser 228, the dispersant is dispensed in a "fast-fill" mode when actuator clamp operator 4224 is retracted at a "¼" position, in a "slow-fill" mode when actuator clamp operator 4224 is retracted at a "⅛" position and in a "jog-fill" mode when actuator clamp operator 4224 is rapidly opened and closed at the "⅛" or "¼" positions, preferably at the "⅛" position for improved dispensing accuracy. The foregoing movements of operator 4224 are accomplished by providing air supply through one of valve 6682 connected to the "¼" travel piston or by providing air supply through the other valve 6682 connected to the "⅛" travel piston, both of these pistons are stack-positioned inside operator 4224. As stated earlier, the biasing means in operator 4224 keep operator 4224 in closed positioned in the absence of air supply from either one of valves 6682.

Controller 6 includes means 669 for generating a weight monitoring signal from weighing scale 446 to direct processor 664 to shut nozzle 2286 on selected dispersant dispenser 228 once an amount of the dispersant determined in accordance with the recipe is dispensed into container 4462. One example of means 669 for generating includes a data/control barrier set for interface with computer (Model YD103-Z), cable for connecting scale 446 to processor 664, and power supply (Model YPSO2-ZKR), all supplied by Sartorius of Edgewood, N.Y. The power supply to scale 446 and all the aforestated components are preferably suitable for use in an environment exposed to flammable solvents.

Figure 9A:
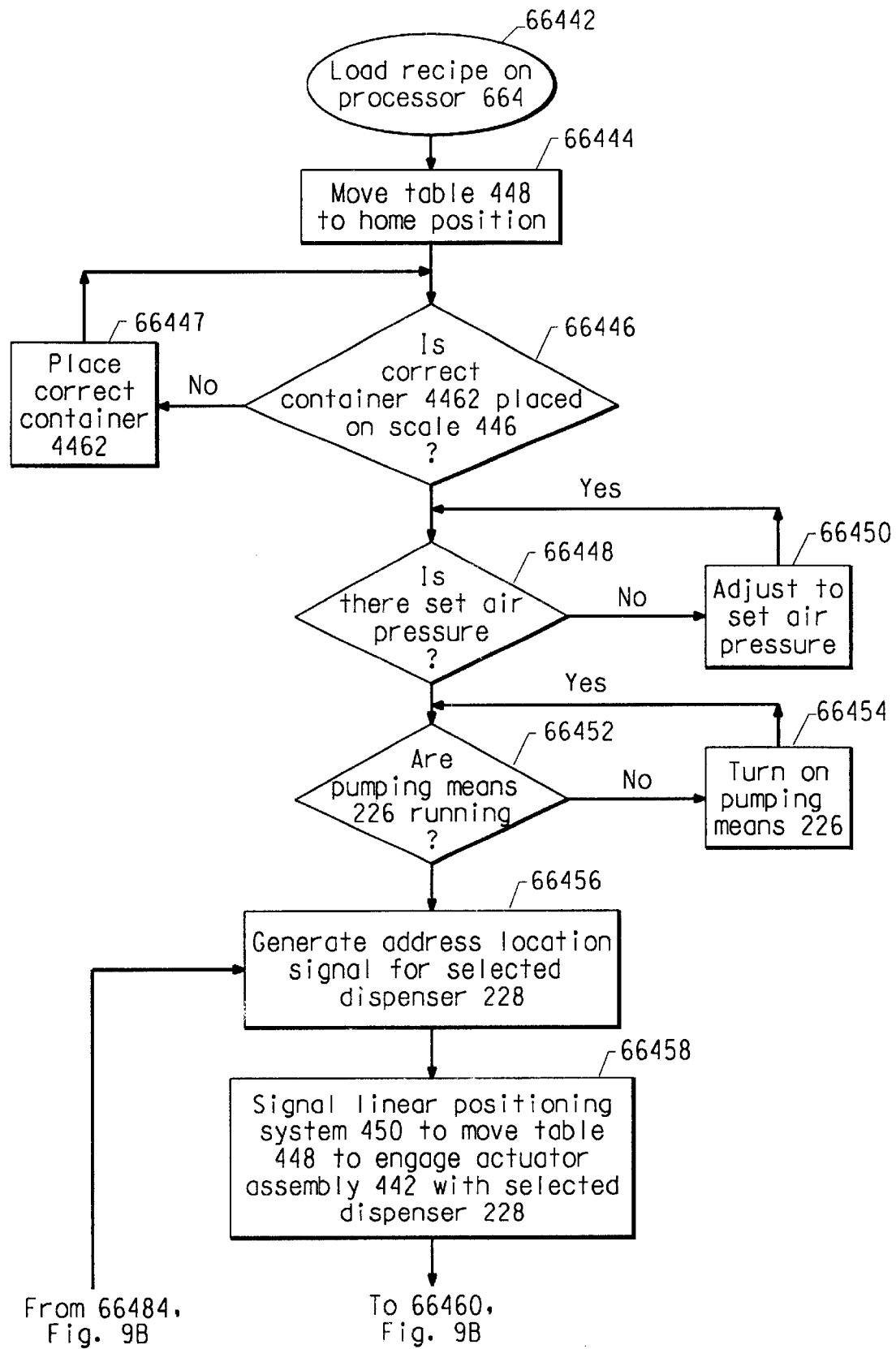
FIGS. 9A, 9B and 9C show an operating program though which a processor of the apparatus is operated.
Figure 9B:
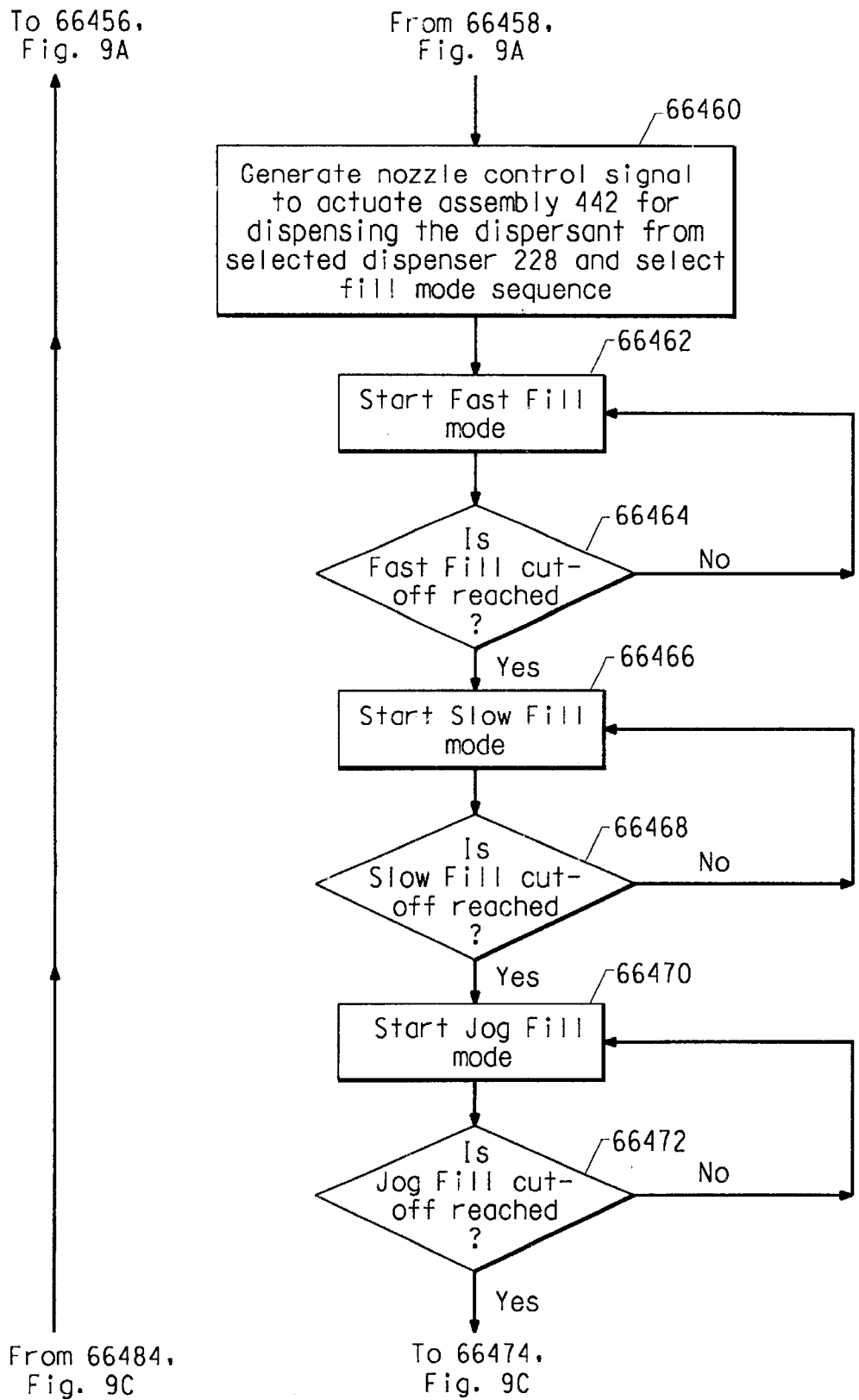
Figure 9C:
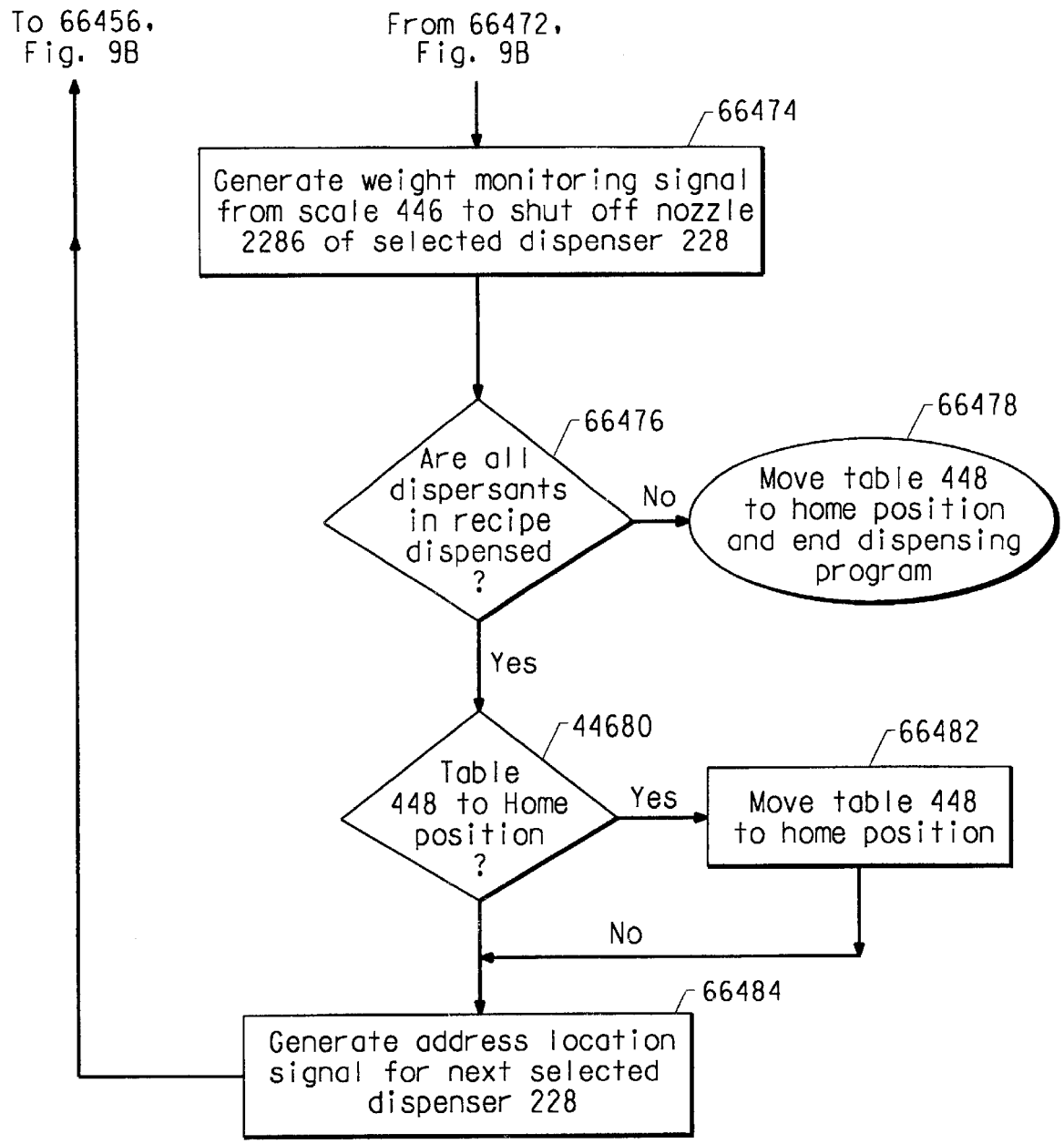

Processor 664 is operated thorough an operating program utilizing a conventional software, such as Visual Basic® Software Version 6 supplied by Microsoft Corporation of Redmond, Wash. FIGS. 9A, 9B and 9C describe the various process steps utilized by the operating program. When operator starts up apparatus 1 for dispensing the dispersants, the recipe from database is retrieved and loaded onto processor 664 in a step 66442. Preferably, processor 664 checks the inventory and availability of all the dispersants required for the recipe. If there are less than the required amounts of dispersants available in reservoirs 222 loaded on rack assembly 230 or if some of the dispersants required in the recipe are missing, then the dispensing process is terminated until the required dispersants are loaded onto rack assembly 230 or added into respective reservoirs 222. For a safer operation, through a step 66444, table 448 is preferably moved into a home position to prevent accidental damage to dispensers 228 and actuator assembly 442. A query 66446 is made upon receiving a signal from weighing scale 446 into processor 664 to make sure a correct container 4462 is positioned on scale 446. Typically, the weight of container 4462 is compared against the weight of a container previously entered into processor 664, if the two do not match, then through a step 66447, a container of desired weight is placed on scale 446 before the process moves forward.

Next a query 66448 is made to make sure apparatus 1 is supplied with set air pressure to ensure proper functioning. Generally, air pressure is set in the range of about 3.4 to 6.8 bars (50 to 100 psig), preferably 4.1 to 5.4 bars (60 to 80 psig). Through a step 66450, air pressure is adjusted to set pressure. Through a query 66452 processor 664 checks recirculating means 2 to make sure pumping means 226 are recirculating all the dispersants to be dispensed through tubings 224. Through a step 66454 processor 664 turns on all desired pumping means 226, if needed. Alternatively, in steps 66450 and 66454, processor 664 can alert the operator to manually adjust air pressure to desired pressure and manually turn on means 2. It should be understood that single-phase dispersants, such as a solvent, might not require recirculation to prevent solid component settling. Thus, it is within the ambit of the present invention to include one or more non-circulating systems wherein no return line from dispenser 228 need be provided back to reservoir 222. Thus, for such non-circulating systems, pumping means 226 are operated only on demand.

Thereafter, processor 664 though a step 66456 generates an address location signal for a selected dispenser 228 selected in accordance with the recipe and through a step 66548 sends a signal to linear positioning system 450 to move table 448 for engaging actuator assembly 442 with the selected dispenser 228 located on table 448.

In a step 66460, processor 664 generates a nozzle control signal to actuate actuator assembly 442 for dispensing the selected dispersant from selected dispenser 228. The nozzle control signal can be also programmed to select the fill modes depending upon the amount being dispensed. Thus, if the amount to be dispensed is comparatively small, just a jog-fill mode can be selected. If the amount to be dispensed is comparatively larger, slow-and jog-fill modes can be selected. For large amounts, all three fill modes, namely, fast-fill, slow-fill and jog-fill modes can be employed. FIGS. 9A, 9B and 9C illustrate the dispensing modes that include all the three fill modes. However, it is understood that not all of these fill modes are needed if the amounts to be dispensed are small. In a step 66462 a fast-fill mode is started and then a query 66464 is made to determine if the cut off for the fast-fill mode has been reached. Upon affirmation, through a step 66466, a slow-fill mode is started and then a query 66468 is made to determine if the cut off for the slow-fill mode has been reached. Upon affirmation, through a step 66470 a jog-fill mode is started and then a query 66472 is made to determine if the cut off for the jog-fill mode has been reached. During all the foregoing steps, scale 446 constantly sends a weight-monitoring signal to processor 664 to monitor the amounts of the dispersants being dispensed.

It is also within the ambit of the present invention to modify step 66470 by adding sub-steps that increase the dispensing efficiency by reducing the cycle time required to dispense a selected dispersant. Step 66470 can include sub-steps for manually entering the nozzle-open time required to complete the dispensing of the selected dispersant in the jog-fill mode. The sub-steps can also include manually entering a limit on the number of jog cycles for each dispersant. An excessive number of jog cycles, for one or more selected dispersants, would extend the overall time needed to complete the dispensing of the recipe. The number of jog cycles can be reduced by increasing the nozzle open time. So, for example, if the manually entered jog cycle limit is exceeded, processor 664 is permitted to increase the nozzle open time required for the jog-fill mode by a percentage (for example 15%), which can also be manually entered. If processor 664 determines that the number of jog cycles required to complete the jog-fill mode is more than the maximum limit for number of jog cycles manually entered for that selected dispersant, processor 664 stores that information in its memory for future reference. If the same dispersant is run again, processor 664 utilizes the previously stored information for the actual number of jog cycles to, for example, increase the nozzle open time for the jog-fill mode, thereby reducing the number of jog cycles for that dispersant and the over all cycle time for the recipe.

In a step 66474, scale 446 generates a final weight monitoring signal to direct processor 664 to shut off nozzle 2286 of the selected dispenser 228 once processor 664 has ensured that an amount of the selected dispersant, as required by the recipe, has been dispensed in container 4462. Thereafter, a query 66476 is made to determine if any additional dispersants are required to be dispersed in accordance with the recipe. If none are required, then through a step 66478, table 448 is moved to its home position and the dispensing program is ended. If query 66476 determines that additional dispersants are required to be dispensed, a query 66480 is made to determine if table 448 needs to be moved to home position, which may be necessary if the next dispenser 228 is located not in the same row as the previous one. Then through a step 66482, table 448 is moved to its home position before an address signal for the next selected dispenser 228 is generated through a step 66484. Thereafter, the dispensing cycle is repeated by repeating steps starting from step 66456.

It should be understood that it is within the contemplation of the present invention to include in the aforedescribed program additional routines. For example, the weights of the dispersants present in each of reservoirs 222 are recorded in the computer of processor 664, which keeps track of the dispersants dispensed by dispenser 228 during the dispensing operation. Thus, a signal or alarm can be provided to alert the operator to replenish the supply of the dispersants once a preset threshold on the quantity of the dispersants remaining in reservoirs 222 is reached. Alternatively or in addition thereto, the computer of processor 664 can be programmed to shut down apparatus 1 if the amount of the dispersants present in one or more reservoirs 222 falls below a preset threshold.

If desired, apparatus 1 can also include one or more particulates flow systems 8. Each flow system 8 includes a particulates metering device 882, shown in FIG. 10, which is positioned on moving table 448. Means 666 for signaling, upon processing the address location signal from processor 664, direct pneumatic linear positioning system 450 to move table 448 to engage actuator assembly 442 with one of metering devices 882 selected in accordance with the recipe comprising predetermined quantities of one or more particulates. Similar to dispersant dispensers 228, metering devices 882 are positioned at locations on the matrix on table 448 having addresses that can be referenced via controller 6. It should be understood that it is within the contemplation of the present invention to provide table 448 with only dispensers 228 to only dispense dispersants, with only metering devices 882 to only dispense particulates; or a mix of dispensers 228 and devices 882 to dispense the dispersants and particulates.

Upon processing an auger control signal from processor 664, means 668 for actuating dispenser actuator assembly initiate or terminate gravimetric release of particulates from the selected metering device 882 into container 4462, wherein means 669 for generating weight monitoring signal direct processor 664 to terminate the release of the particulates into container 4462 once an amount of the particulates determined in accordance with said recipe, is dispensed into container 4462.

Figure 10:
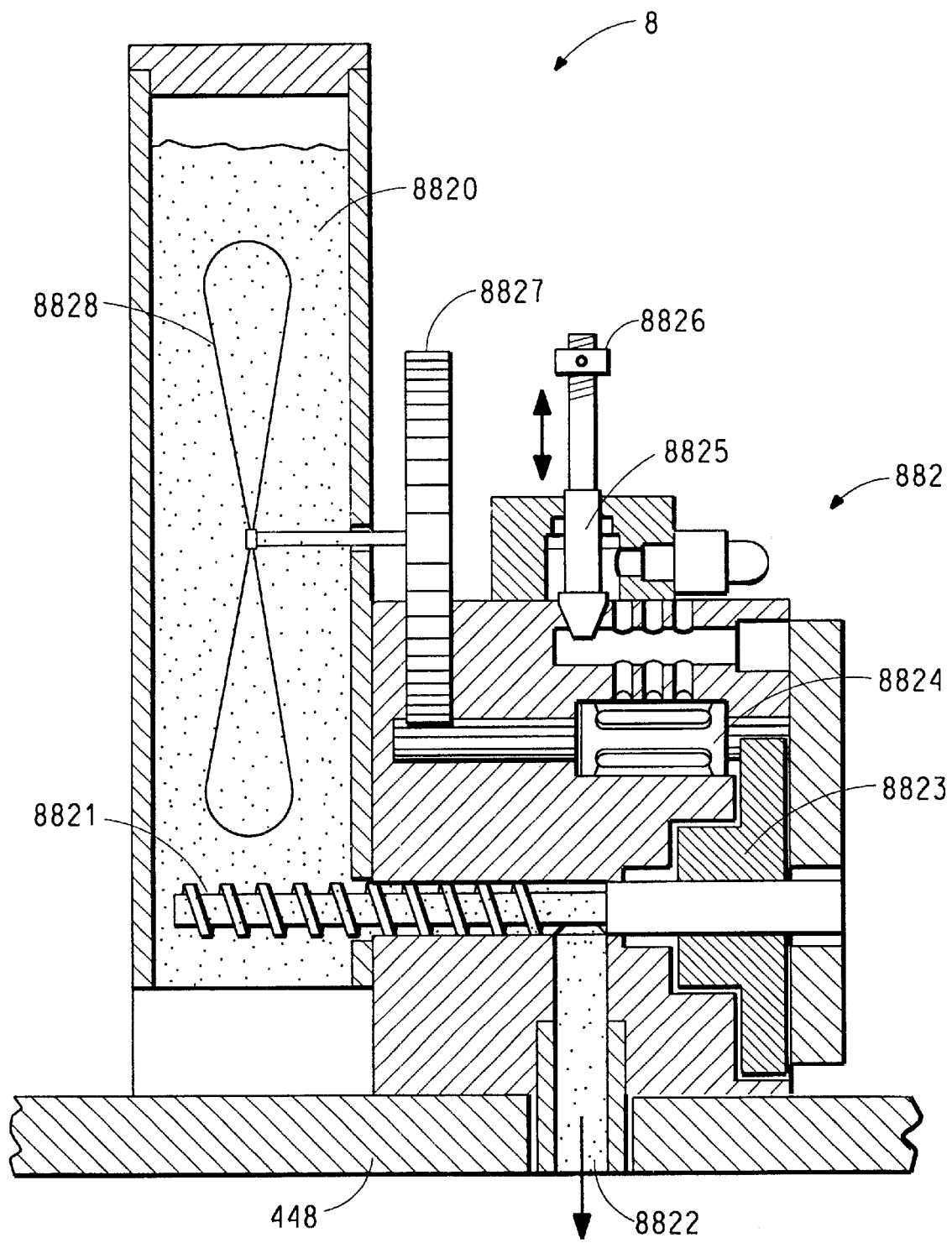
FIG. 10 shows a cross-section of a metering device of a particulates flow system.

As seen in FIG. 10, metering device 882 includes a storage hopper 8820 used for storing the particulates, an auger 8821 which upon rotation delivers metered amount of the selected particulates though an orifice 8822 of an elongated tube into container 4462. A first gear system 8823 operated by an air turbine 8824 rotates auger 8821, and a tapered valve 8825, which when actuated by actuator assembly 442 delivers a controlled amount of air to operate turbine 8824. Preferably, device 882 is provided with a second gear system 8827 to operate a looped wire agitator 8828 to agitate particulates stored in hopper 8820 during the dispensing of the particulates.

Actuator clamp 4422 of actuator assembly 442 engages a threaded valve head 8826 of device 882 to initiate or terminate the rotation of auger 8821. The auger control signal from processor 664 controls the travel of actuator clamp operator 6682 to provide the three-positions to actuator clamp operator 6682 described earlier. As a result, when clamp 4422 engages valve head 8826 connected to tapered valve 8825, the particulates are dispensed in a "fast-fill" mode when actuator clamp operator 6682 is fully retracted at "0" position, in a "slow-fill" mode when actuator clamp operator 6682 is half-way retracted at "⅛" position and in a "jog-fill" mode when actuator clamp operator 6682 is rapidly opened and closed at "¼" position.

Typically, table 448 is provided with a few of metering devices 882. Preferably, the particulates are weighed in before they are put into storage hopper 8820 and the weight is recorded in the computer of processor 664, which keeps track of particulates dispensed by device 882 during operation. Thus, a signal or alarm can be provided to alert the operator to replenish the supply of the particulates in hopper 8820 once a preset threshold on the quantity of the particulates in hopper 8820 is reached. Alternatively or in addition thereto, processor 664 can be programmed to shut down apparatus 1 if the amount of the particulates present in hopper 8820 falls below a preset threshold.

Alternatively, it should be understood that apparatus 1 could be provided with a plurality of automated particulate flow systems wherein each of the flow system includes:

(1) a storage bin containing the particulates,
(2) particulates metering device 882,
(3) a conventional pneumatic conveying system connected between the bin and hopper 8820 positioned on particulates metering device 882; and
(4) a hopper level switch positioned in hopper 8820, wherein the switch sends a demand signal to the pneumatic conveying system to replenish supply of the particulates from the bin into hopper 8820 when the quantity of particulates in hopper 8820 falls below a preset level.

Figure 7:
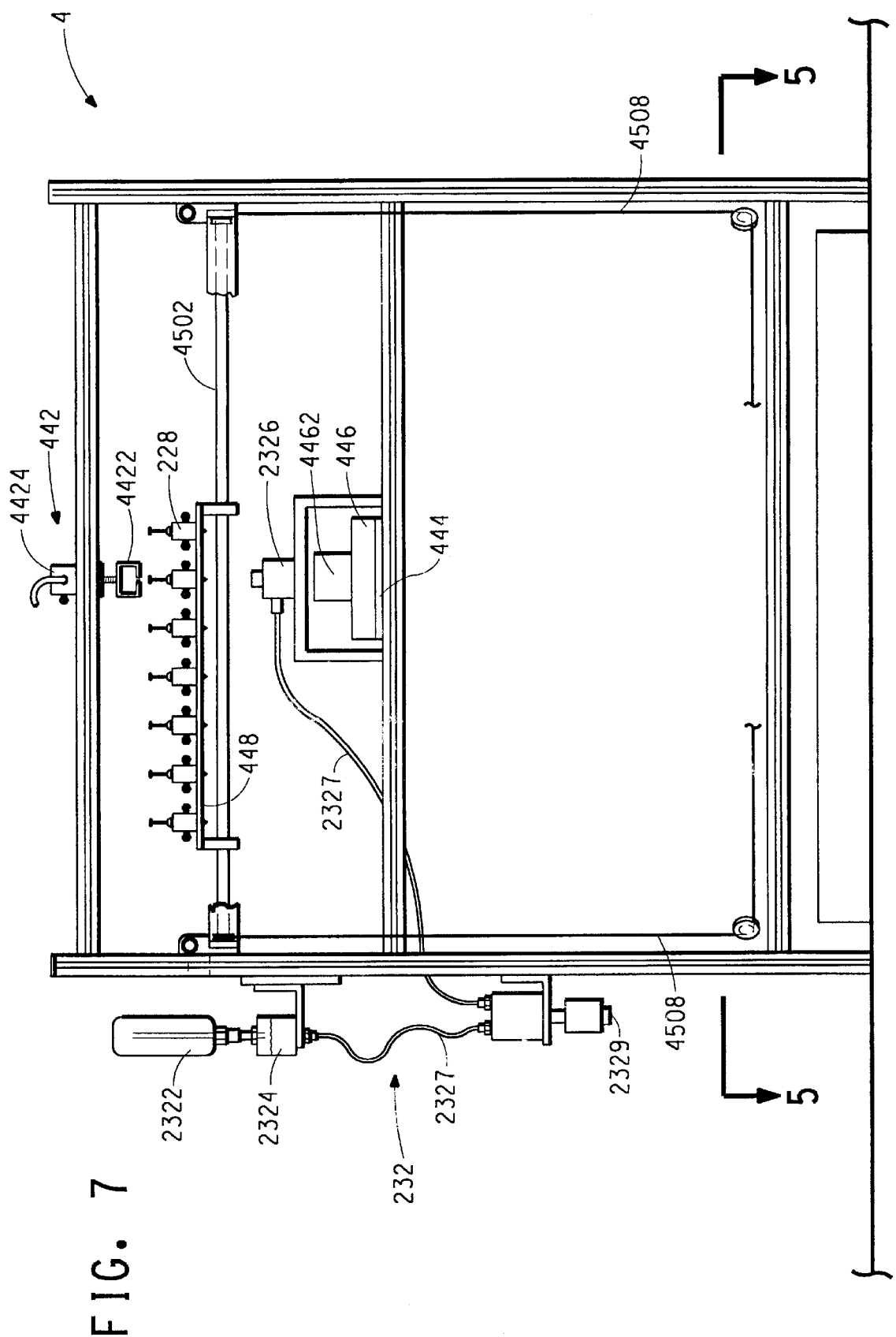
FIG. 7 shows the side elevation of the frame assembly.
Figure 11:
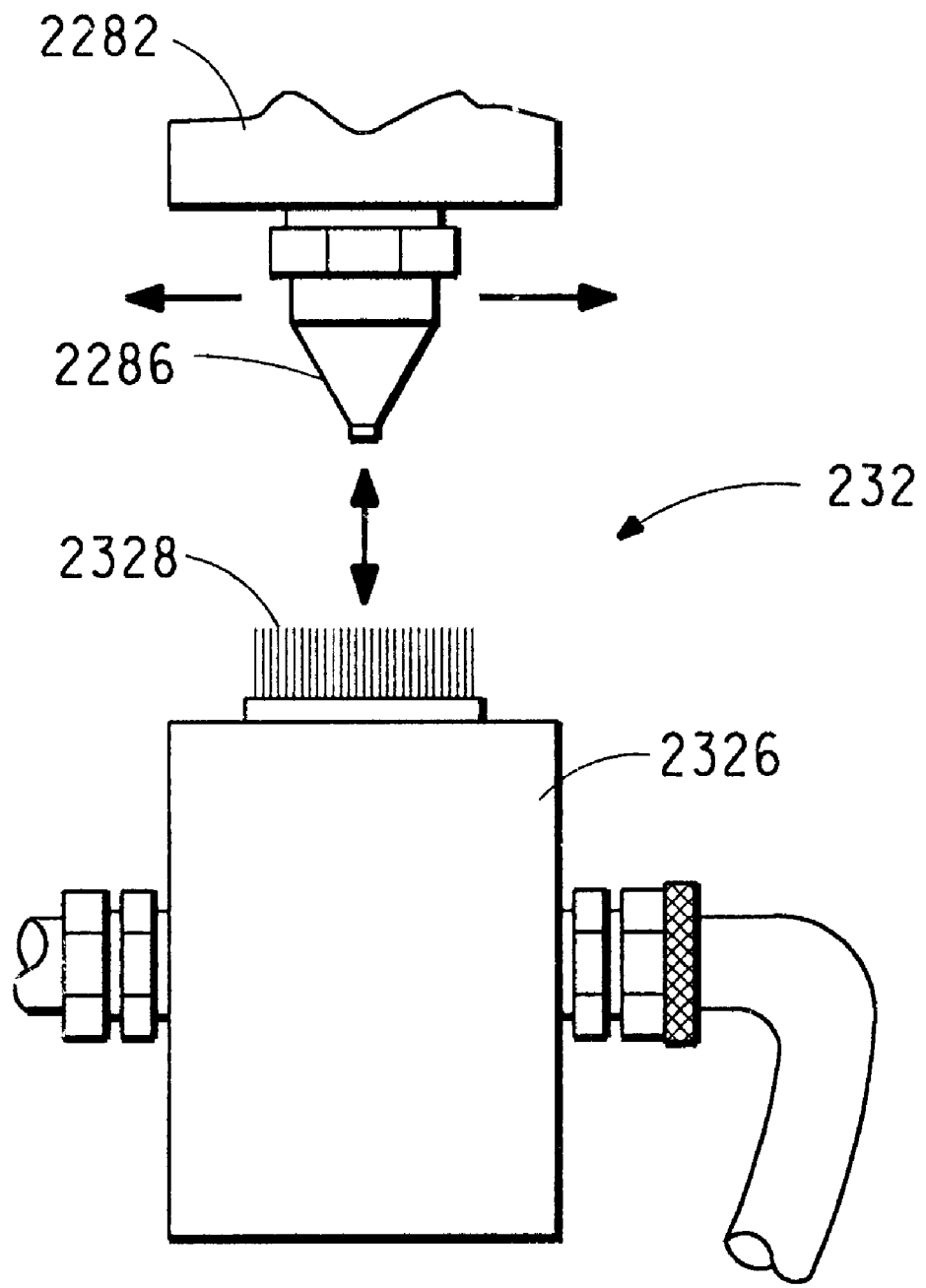
FIG. 11 shows a nozzle-cleaning module of a nozzle cleaning system of the apparatus.

If desired, apparatus 1, as shown in FIGS. 7 and 11 can be also provided with a gravity-fed nozzle cleaning system 232 to clean nozzles 2286 before and after dispensing the dispersants. System 232 includes a wash-fluid tank 2322 containing a conventional wash-fluid, such as a solvent or water. Tank 2322 can be detached from a base 2324, so that tank 2322 can be replenished with the wash-fluid. System 232 further contains a nozzle cleaning module 2326 connected to base 2324 via an inert tubing 2327, such as one made of polyethylene. Cleaning module 2326 is preferably positioned adjacent to dispenser actuator assembly 442 such that nozzle 2286 of dispersant dispenser 228 passes through nozzle cleaning module 2326 to clean nozzle 2286 before and after dispersant dispenser 228 dispenses the dispersant. Nozzle cleaning module 2326 is kept wet with the wash-fluid from base 2324 by gravity, i.e., the level of wash-fluid in base 2324 is at the same level as that in nozzle cleaning module 2326, such that, as the wash-fluid in nozzle cleaning module 2326 is consumed during the nozzle cleaning step, the wash-fluid from base 2324 seeks the same level in nozzle cleaning module 2326. When the level of the wash-fluid in base 2324 drops, air, introduced into base 2324 through a breather hole in base 2324, replaces the wash-fluid in base, 2324. The additional air then escapes into tank 2322 and an equivalent volume of the wash-fluid from tank 2322 enters into base 2324. Module 2326 is provided with a pad 2328 exposed to the wash-fluid. Pad 2328 includes absorbable soft bristles that are capable of efficiently wicking-up the wash-fluid. Pad 2328 can also include bristles that are stiff enough to further assist in cleaning nozzle 2286 from any dried up dispersant that may be clinging to nozzle 2286. Preferably, pad 2328 includes substantially equal numbers of interspersed soft and stiff bristles. Generally, soft bristles made of Nylon or polyethylene fibers and stiff bristles made from brass are well suited. Any solid components removed by the wash fluid are collected in a sump looped through inert tubing 2327 at the bottommost point. Through a drain valve 2329 the solid components that collect to the bottom can be removed from cleaning system 232.

Since the particulates are generally kept in a dry state, it is preferable that the particulates are not exposed to the wash-fluid the wash-fluid. Thus, when apparatus 1 is provided with particulates flow system 8, orifice 8822 of metering device 882 is preferably flush with the bottom surface of movable table 448 to prevent the elongated tube that forms orifice 8822 from touching nozzle cleaning module 2386.

As seen in FIG. 8, for additional safety, frame assembly 4 of apparatus 1 can be provided with a sloped drip pan 452 to collect any accidental spills of the dispersants. Preferably a sensor 454 is positioned in pan 452 for detecting the presence of the spills. One such sensor supplied by Pepperal+Fuchs of Twinsburg, Ohio is known as CJ10-30GM-N-Z10 Capacitance fluid level sensor. Once the spill is detected by sensor 454, a signal is preferably sent to processor 664 to turn off apparatus 1 for safer operation.

As seen in FIG. 1, all the components of apparatus 1, such as processor 664, that carry electrical currents are segregated from other components by adequate clearance or by a fire wall 5 to meet the Class I, Division I Electrical Classification Codes 30, 33 and 70 stipulated in National Fire Protection Association (NFPA), Quincy, Mass. The aforestated codes, current as of year 2002, are incorporated herein by reference.

Apparatus 1 of the present invention is well suited to dispense compositions, such as a paint; nail polish; lip stick; eye shadow; adhesive; perfume; fragrance; caulk; masonry wall repair kit; catalyst blend; pharmaceutical drug; printing ink; ink jet ink; food additive; polymer blend; blend of reactants; or a point-of-purchase consumer product.

It is within the ambit of the present invention to automate the dispensing and delivery of the compositions. For, example, a conveyer belt may be provided in frame assembly 4 on which series of containers 4462 are placed. A robotic arm can then pick and place selected container 4462 on weighing scale 446 for dispensing the compositions as described above. Once the dispensing process is completed, the robotic arm can the pick and place container 4462 containing the composition back on the conveyer belt or on a separate conveyer belt.

Apparatus 1 of the present invention can be also used to produce designer automotive paints, i.e., a buyer can take her favorite object, such as a purse, shirt, blouse or a sweater to a car dealer, wherein the car dealer can scan the object, to determine its color values, hues and strengths, which can then be sent via e-mail, website or dedicated computerized network to an auto manufacturer. There are a number of conventional programs that can break down the customer color into a recipe based on a combination various tints of fixed amounts. Apparatus 1 of the present invention can then be readily used to produce the custom paint utilizing the various tints loaded into reservoirs 222 of apparatus 1. As the selected automobile body arrives at a paint station, it can then be painted with a custom paint, which has been matched to a designer color desired by the customer. A similar process can be used in repainting automobiles with different customer colors specifically desired by a customer or for painting repaired automobile in automotive refinish collision repair shops that sometimes require very small amounts of paints for touch ups and repairs.

Similar process could be employed in producing a one-of-a-kind lipstick or a nail polish that is custom matched to the color of customer's shoes, purse, scarf, dress, etc. Moreover, since apparatus can be scaled to a smaller size, it could be placed, for example, near a shopping counter in a shopping mall.

If the recipe developer wishes to keep the recipe confidential, a collision shop manager can be provided with a color identifier code for a confidential recipe, which could be tied to a VIN. Shop manager enters the code on a color formulation web page of a website inter-connected to processor 664. DuPont Company of Wilmington, Del. supports such a website known as DPC Business Solutions Web Page. Alternatively, the collision shop could measure the color position of the automobile to be repaired and repainted by using a calorimeter, such as the Chromavision® colorimeter supplied by DuPont Company of Wilmington, Del. The color position could be communicated to a recipe development processor that creates a color recipe that matches the color position entered into the recipe development processor. The recipe is downloaded directly into processor 664, which then dispenses the composition, such as a paint at needed quantities without sharing the recipe with the shop manager. The advantage of the foregoing process is that it not only keep the recipe confidential but it also to extends it to dispensing some confidential additives that may be time sensitive, i.e., for example, if a composition has a short shelf life due to the presence of a certain additive or a crosslinker, the additive could be dispensed into the remainder of the composition just before use. The foregoing process can also keep track of the dispersants, which could be supplied by the recipe developer. Thus, as the selected dispersants required in the recipe are consumed, processor 664 can monitor the rate of consumption and send the consumption data via, for example, a website interconnected to processor 664, to the recipe developer who can then replenish the stock of the consumed dispersants to the user. Moreover, by keeping track of the rate of consumption of the dispersants required in the recipe in real time,, the recipe developer can also ensure that the user does not substitute the recipe developer supplied dispersants with those from a third party.

What is claimed is:

1. A dispensing apparatus comprising:
    (1) a plurality of recirculating systems wherein each said recirculating system comprises a reservoir containing a dispersant, a closed loop of a tubing connected to said reservoir, pumping means positioned in said loop for recirculating said dispersant to and from said reservoir at an elevated pressure, and a dispersant dispenser positioned in said loop;

(2) a frame assembly comprising:

(a) a dispenser actuator assembly for actuating said dispersant dispenser, said assembly positioned above a platform having a weighing scale positioned thereon;

(b) a movable table positioned between said dispenser actuator assembly and said weighing scale, said table having said dispersant dispensers of said plurality of recirculating systems positioned thereon;

(c) a pneumatic linear positioning system for moving said movable table in X and Y directions; and (3) a controller comprising:

(a) means for retrieving a recipe for a composition from a database, said recipe comprising predetermined quantities of said dispersants, which when mixed together result in said composition;

(b) means for signaling said pneumatic linear positioning system to move, upon processing an address location signal from a processor, said table for engaging said actuator assembly with one of said dispersant dispensers selected in accordance with said recipe;

(c) means for actuating said dispenser actuator assembly to open or to shut, upon processing a nozzle control signal from said processor, a nozzle on said selected dispersant dispenser to gravimetrically dispense said dispersant into a container placed on said weighing scale; and (d) means for generating a weight monitoring signal from said weighing scale to direct said processor to shut off said nozzle on said selected dispersant dispenser once an amount of said dispersant determined in accordance with said recipe is dispensed into said container.

2. The apparatus of claim 1 further comprising:

one or more particulates metering devices positioned on said moving table wherein said means for signaling, upon processing said address location signal from said processor, direct said pneumatic linear positioning system to move said table for engaging said actuator assembly with one of said metering devices selected in accordance with said recipe comprising predetermined quantities of one or more particulates; wherein, upon processing an auger control signal from said processor, said means for actuating dispenser actuator assembly initiate or terminate gravimetric release of particulates from said selected metering device into said container; and wherein said means for generating weight monitoring signal direct said processor to terminate the release of the particulates into said container once an amount of the particulates determined in accordance with said recipe is dispersed into said container.

3. The apparatus of claim 1 further comprising a gravity-fed nozzle cleaning system, said system comprising:

(1) a wash-fluid tank;

(2) a nozzle cleaning module kept wet with a wash-fluid from said tank, said module being positioned adjacent to said dispenser actuator assembly such that said nozzle of said dispersant dispenser passes through said nozzle cleaning module to clean said nozzle before and after said dispersant dispenser dispenses said dispersant.

4. The apparatus of claim 3 wherein a pad of said nozzle-cleaning module comprises bristles.

5. The apparatus of claim 3 wherein said pad comprises substantially equal numbers of interspersed soft and stiff bristles.

6. The apparatus of claim 5 wherein said soft bristles are made of nylon and said stiff bristles are made of brass.

7. The apparatus of claim 1 wherein said apparatus has 70 said recirculating systems.

8. The apparatus of claim 1 wherein said reservoirs from said plurality of recirculating systems are positioned on a rack assembly.

9. The apparatus of claim 8 wherein said pumping means from said plurality of recirculating systems are positioned on said rack assembly.

10. The apparatus of claim 1 wherein said pumping means include a low pulse double acting piston pump.

11. The apparatus of claim 1 or 10 wherein said loop includes a surge suppressor for reducing pressure fluctuations in said elevated pressure.

12. The apparatus of claim 1 wherein said elevated pressures range from 5 to 70 psig.

13. The apparatus of claim 1 wherein said dispersant dispenser is provided with a tapered needle valve to increase dispensing accuracy of said dispersant dispenser.

14. The apparatus of claim 13 wherein said dispersant dispenser is provided with a threaded valve head to adjust a rate at which said dispersant is dispensed through said nozzle.

15. The apparatus of claim 1 or 14 wherein said means for actuating provide a fast-fill, slow-fill or a jog-fill modes.

16. The apparatus of claim 1 or 2 wherein said pneumatic linear positioning system comprises a movable framework connected to a plurality of X pneumatic cylinders mounted on said frame assembly, and a plurality of Y pneumatic cylinders connected to said movable table and mounted on said movable framework, such that upon processing a signal from said means for signaling, said movable table is moved in said X and Y directions to engage said selected dispersant dispenser with said dispenser actuator assembly or to position said movable table in a home position.

17. The apparatus of claim 16 wherein said X and Y pneumatic cylinders are of different fixed stroke lengths such that by extending or retracting said cylinders, said table is moved to an address on said table that corresponds to said selected dispersant dispenser or particulates metering device.

18. The apparatus of claim 17 wherein said movable framework is provided with a wire cable guide assembly to prevent jamming of said framework during motion.

19. The apparatus of claim 1 wherein said frame assembly is provided with a sloped drip pan to collect spills and a sensor positioned in said pan for detecting the presence of said spills.

20. The apparatus of claim 1 wherein said platform is provided with a dampening block to prevent vibrations from reaching said weighing scale.

21. The apparatus of claim 1 wherein said weighing scale has a weighing accuracy ranging from ±0.001 to ±0.01 grams.

22. The apparatus of claim 1 wherein components of said apparatus that carry electrical currents are segregated from other components to meet the Class I, Division I Electrical Classification Codes 30, 33 and 70 specified by National Fire Protection Association (NFPA), Quincy, Mass.

23. The apparatus of claim 2 wherein said composition comprises dispersants, particulates or a combination thereof.

24. The apparatus of claim 23 wherein said composition is a paint; nail polish; lip stick; eye shadow; adhesive;

perfume; fragrance; caulk; masonry wall repair kit; catalyst blend; pharmaceutical drug; printing ink; ink jet ink; food additive; polymer blend; blend of reactants; or a point-of-purchase consumer product.

25. A method of producing a composition comprising:

(1) recirculating a plurality of dispersants thorough recirculating systems of an apparatus wherein each said recirculating system comprises a reservoir containing said dispersant, a closed loop of a tubing connected to said reservoir, pumping means positioned in said loop for recirculating said dispersant to and from said reservoir at an elevated pressure, and a dispersant dispenser positioned in said loop;

(2) retrieving a recipe for said composition from a database, said recipe comprising predetermined quantities of said dispersants, which when mixed together result in said composition;

(3) directing a pneumatic linear positioning system of a frame assembly of said apparatus to move in X and Y directions, upon processing an address location signal from a processor of said apparatus, a movable table to engage a dispenser actuator assembly with one of said dispersant dispensers selected in accordance with said recipe, wherein said table is positioned between said dispenser actuator assembly and a weighing scale of said frame assembly, said table having a plurality of said dispersant dispensers positioned thereon;

(4) actuating said dispenser actuator assembly to open or to shut, upon processing a nozzle control signal from said processor, a nozzle on said selected dispersant dispenser to gravimetrically dispense said dispersant into a container placed on said weighing scale; and (5) generating a weight monitoring signal from said weighing scale to direct said processor to shut said nozzle on said selected dispersant dispenser once an amount of said dispersant determined in accordance with said recipe is dispensed into said container.

26. The method of claim 25 further comprising:

(1) directing, upon processing said address location signal from a processor, said pneumatic linear positioning system to move said table for engaging said actuator assembly with one of one or more particulates metering devices positioned on said moving table, said metering device selected in accordance with said recipe comprising predetermined quantities of one or more particulates; and (2) actuating said dispenser actuator assembly to initiate or to terminate, upon processing an auger control signal from said processor, gravimetric release of particulates from said selected metering device into said container, wherein said means for generating said weight monitoring signal direct said processor to terminate the dispensing of said particulates into said container once an amount of said particulates determined in accordance with said recipe, is dispensed into said container.

27. The method of claim 25 comprising traversing said nozzle of said dispersant dispenser through a nozzle cleaning module to clean said nozzle before and after said dispersant dispenser dispenses said dispersant.

28. The method of claim 25 or 26 wherein said recipe is retrieved from said database located at a remote location.

29. The method of claim 25 or 26 wherein said recipe is retrieved by accessing said database via a website.

30. The method of claim 29 wherein said processor stores data on amounts of the dispersants dispensed by the dispersant dispensers.

31. The method of claim 30 wherein said processor sends the data collected on the amounts of the dispersants dispensed by the dispersant dispensers to a recipe developer to monitor the rate of consumption of the dispersants dispensed by the dispersant dispensers.

32. A composition produced by the method of claim 25 or 26, wherein said composition is a paint; nail polish; lip stick; eye shadow; adhesive; perfume; fragrance; caulk; masonry wall repair kit; catalyst blend; pharmaceutical drug; printing ink; ink jet ink; food additive; polymer blend; blend of reactants; or a point-of-purchase consumer product.

* * * * *